(12) United States Patent
Li et al.

(10) Patent No.: US 12,470,510 B2
(45) Date of Patent: *Nov. 11, 2025

(54) INFORMATION, ELECTRONIC DEVICE, COMPUTER STORAGE MEDIUM, AND PRODUCT

(71) Applicant: Beijing Bytedance Network Technology Co., Ltd., Beijing (CN)

(72) Inventors: Xinyi Li, Beijing (CN); Na Sun, Beijing (CN); Siqi Tan, Beijing (CN); Ye Lin, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/575,120

(22) PCT Filed: May 23, 2022

(86) PCT No.: PCT/CN2022/094349
§ 371 (c)(1),
(2) Date: Dec. 28, 2023

(87) PCT Pub. No.: WO2023/273692
PCT Pub. Date: Jan. 5, 2023

(65) Prior Publication Data
US 2025/0016421 A1    Jan. 9, 2025

(30) Foreign Application Priority Data

Jul. 1, 2021  (CN) ......................... 202110746236.X

(51) Int. Cl.
*H04N 5/445* (2011.01)
*G06F 3/0482* (2013.01)
(Continued)

(52) U.S. Cl.
CPC ............ *H04L 51/52* (2022.05); *G06F 3/0482* (2013.01); *H04L 51/10* (2013.01); *H04L 51/224* (2022.05);
(Continued)

(58) Field of Classification Search
CPC ....... H04L 51/52; H04L 51/10; H04L 51/224; G06F 3/0482; G06F 16/44; G06F 9/451;
(Continued)

(56) References Cited

U.S. PATENT DOCUMENTS 10,021,458 B1 *  7/2018  Taylor ................ H04N 21/2187
10,623,917 B1 *  4/2020  Paul .................... G06F 16/9535
(Continued)

FOREIGN PATENT DOCUMENTS

CN    108039996 A    5/2018
CN    109348299 A    2/2019
(Continued)

OTHER PUBLICATIONS

Decision to Grant a Patent from Japanese patent application No. 2023-580728 mailed on Jul. 16, 2024, 7 pages (4 pages English Translation and 3 pages Original Copy).
(Continued)

*Primary Examiner* — Benjamin R Bruckart
*Assistant Examiner* — Sahar Aqil Riaz

(57) ABSTRACT

The present disclosure relates to a method and an apparatus for replying to information, electronic device, computer storage medium, and product. The method includes: playing first multimedia content and displaying a first sticker comprising target information in a playing interface of the first multimedia content, wherein the target information is associated with target multimedia content; receiving a first instruction for the first sticker which instructs to make a reply to the target information in multimedia form; and in
(Continued)

response to receiving the first instruction, acquiring second multimedia content for replying to the target information.

17 Claims, 9 Drawing Sheets

(51) Int. Cl.
- H04L 51/10 (2022.01)
- H04L 51/224 (2022.01)
- H04L 51/52 (2022.01)
- H04N 21/431 (2011.01)
- H04N 21/4788 (2011.01)
- H04N 21/858 (2011.01)

(52) U.S. Cl.
CPC ..... *H04N 21/4316* (2013.01); *H04N 21/4788* (2013.01); *H04N 21/858* (2013.01)

(58) Field of Classification Search
CPC .......... H04N 21/4316; H04N 21/4788; H04N 21/858
USPC .......................................................... 725/37
See application file for complete search history.

(56) References Cited

U.S. PATENT DOCUMENTS

| | | | | |
|---|---|---|---|---|
| 11,449,664 B1* | 9/2022 | Lopez | .................... | G06F 40/106 |
| 11,611,714 B2* | 3/2023 | Cutler | .................... | H04N 5/272 |
| 11,711,334 B2* | 7/2023 | Li | ............................ | H04L 51/10 |
| | | | | 709/206 |
| 2008/0071875 A1* | 3/2008 | Koff | ........................ | H04L 51/06 |
| | | | | 709/206 |
| 2011/0078251 A1* | 3/2011 | Cross | ...................... | H04L 51/04 |
| | | | | 709/227 |
| 2014/0280571 A1* | 9/2014 | Tarbox | ............. | H04N 21/43072 |
| | | | | 709/204 |
| 2015/0127643 A1* | 5/2015 | Cohen | .................... | G06F 16/447 |
| | | | | 707/725 |
| 2015/0331842 A1* | 11/2015 | Costa | ...................... | H04L 67/02 |
| | | | | 715/202 |
| 2016/0275588 A1 | 9/2016 | Ye et al. | | |
| 2018/0246983 A1* | 8/2018 | Rathod | .................. | G06F 16/972 |
| 2019/0259387 A1* | 8/2019 | Mertens | ................ | G10L 15/197 |
| 2019/0288972 A1* | 9/2019 | Morrison | ................ | H04L 51/52 |
| 2019/0324612 A1* | 10/2019 | Du | ......................... | G06F 3/0481 |
| 2020/0027172 A1* | 1/2020 | Benfield | ............ | G06Q 30/0201 |
| 2020/0111173 A1* | 4/2020 | Benfield | ............. | G06F 16/4393 |
| 2020/0242666 A1 | 7/2020 | Li | | |
| 2021/0303112 A1* | 9/2021 | Harrison | ................ | G06F 3/0488 |
| 2022/0101415 A1* | 3/2022 | Devoy, III | ......... | G06Q 30/0601 |
| 2022/0180452 A1* | 6/2022 | Lopez | .................... | G06F 3/0483 |
| 2022/0210511 A1 | 6/2022 | Yan et al. | | |
| 2022/0263877 A1* | 8/2022 | Conlin | .................. | G06N 20/00 |
| 2022/0391060 A1* | 12/2022 | Han | ...................... | G06F 3/04842 |
| 2024/0214338 A1* | 6/2024 | Huang | .................... | H04L 51/52 |
| 2025/0005050 A1* | 1/2025 | Krishnan | ............... | G06F 16/243 |

FOREIGN PATENT DOCUMENTS

| | | |
|---|---|---|
| CN | 109618212 A | 4/2019 |
| CN | 109618612 A | 4/2019 |
| CN | 109743635 A | 5/2019 |
| CN | 110069620 A | 7/2019 |
| CN | 112492355 A | 3/2021 |
| CN | 112672219 A | 4/2021 |
| CN | 112698769 A | 4/2021 |
| CN | 113747223 A | 12/2021 |
| JP | 2017-509938 A | 4/2017 |

OTHER PUBLICATIONS

European Search Report for EP Patent Application No. 22831516.4, Issued on Jul. 31, 2024, 7 pages.
Final Office Action mailed on Dec. 1, 2022, for U.S. Appl. No. 17/709,629, pp. 16.
International Search Report and Written Opinion received for PCT Patent Application No. PCT/CN2022/094349 , mailed on Aug. 23, 2022, 11 pages (5 pages of English Translation and 6 pages of Original Document).
Non-Final Office Action mailed on Jul. 14, 2022, for U.S. Appl. No. 17/709,629, pp. 16.
Notice of Allowance mailed on Mar. 3, 2023, for U.S. Appl. No. 17/709,629, pp. 10.

* cited by examiner

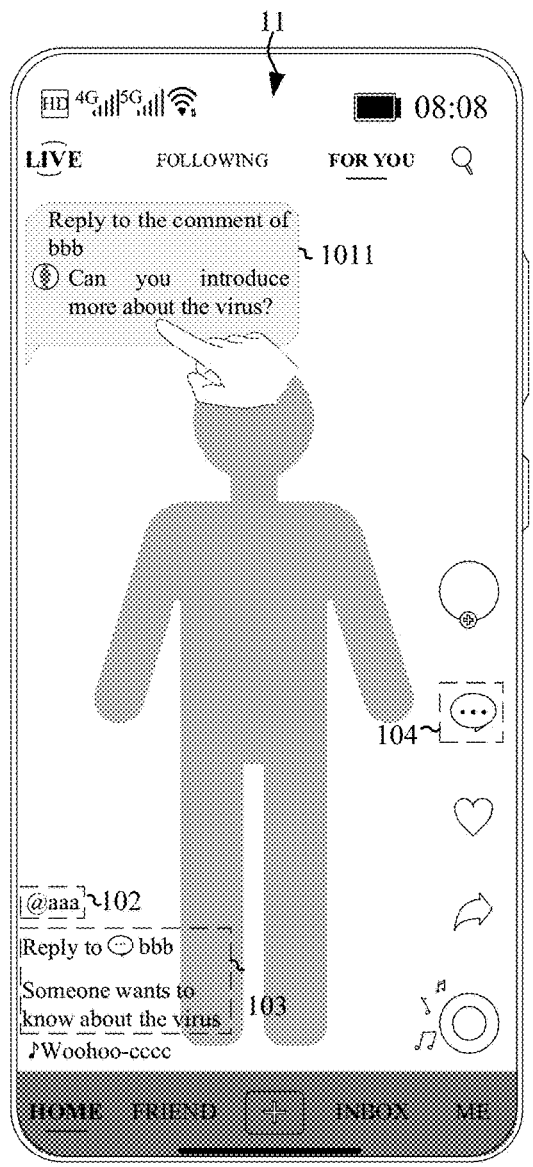
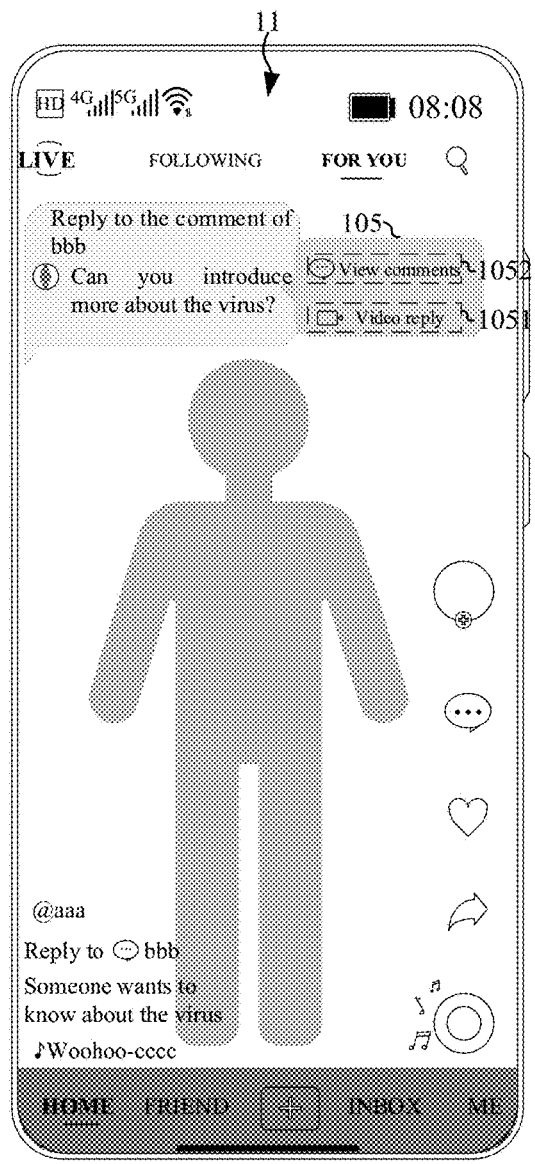
Fig.1A                    Fig.1B

INFORMATION, ELECTRONIC DEVICE, COMPUTER STORAGE MEDIUM, AND PRODUCT

CROSS-REFERENCE TO RELATED APPLICATIONS

The present disclosure is a U.S. National Stage Application under 35 U.S.C. § 371 of International Patent Application No. PCT/CN2022/094349, filed on May 23, 2022, which is based on and claims priority of Chinese application for invention No. 202110746236.X, filed on Jul. 1, 2021, the disclosure of which is hereby incorporated into this disclosure by reference in its entirety.

TECHNICAL FIELD

This disclosure relates to the technical field of Internet, in particular to a method and an apparatus for replying to information, electronic device, computer storage medium, and product.

BACKGROUND

With the continuous development of Internet technology, when watching multimedia content on clients, users often want to reply to comment and/or question information relating to the multimedia content. At present, the user can reply to the comment and/or question information only after a comment area is displayed in the playing interface of the multimedia content.

SUMMARY

In a first aspect, the present disclosure provides an information replying method, including:
  displaying first multimedia content comprises a first sticker comprising target information, wherein the target information is at least one of comment information or question information associated with original multimedia content, and the first multimedia content comprises multimedia content that replies to the target information;
  receiving a first instruction triggered on the first sticker which instructs to create second multimedia content to reply to the target information;
  in response to receiving the first instruction, acquiring the second multimedia content for replying to the target information.

In the method provided by the first aspect, after replying to the target information in multimedia form, a client can display a first sticker including the target information in the playing interface of the first multimedia content while playing the first multimedia content. The client can use the first sticker as an entry to make a further reply to the target information in multimedia form. After receiving the first instruction for the first sticker to reply to the target information in multimedia form, the client can obtain a second multimedia content. Thus, by means of the sticker, a further reply can be made to the target information in multimedia form, which is conducive to enriching the way of information replying, improving the interest of users in information replying, and increasing the chance of users creating and publishing multimedia contents.

In some embodiments, the method further includes:
  receiving a second instruction triggered on the first sticker, wherein the second instruction is used to instruct to view the target information;
  switching to a playing interface of the target multimedia content in response to the second instruction, and displaying the target information and a comment card in a comment area of the playing interface of the target multimedia content, wherein the comment card comprises a thumbnail comprising a playing picture of the first multimedia content and the first sticker.

In some embodiments, the method further includes:
  displaying a link associated with the target information in a playing interface of the first multimedia content, wherein the link is used to trigger a display of the target information;
  receiving a trigger operation on the link, switching to the playing interface of the target multimedia content, and displaying the target information and a comment card in the comment area of the playing interface of the target multimedia content, wherein the comment card comprises a thumbnail comprising a playing picture of the first multimedia content and the first sticker.

In some embodiments, the method further includes:
  adding a link associated with the target information to the second multimedia content to obtain second multimedia content with the link added, wherein the link is used to trigger a display of the target information; and
  uploading the second multimedia content with the link added to a server to display the link in a playing interface of the second multimedia content.

In some embodiments, the method further includes:
  uploading the second multimedia content to a server so that the server sends a notification message to at least one client associated with the target information, wherein the notification message is used to notify the at least one client that the target information has been replied in multimedia form.

In some embodiments, the method further includes:
  displaying an aggregation page of at least one multimedia content associated with the target information in the first sticker after receiving a third instruction for the first sticker.

In some embodiments, the first multimedia content is acquired after receiving a fourth instruction indicating a multimedia reply to the target information displayed in the comment area of the playing interface of the target multimedia content; or
  the first multimedia content is acquired after receiving a fifth instruction indicating a multimedia reply to the target information displayed in a third sticker.

In some embodiments, the in response to receiving the first instruction, acquiring second multimedia content for replying to the target information includes:
  switching to an acquisition interface of the second multimedia content in response to the first instruction; and
  acquiring the second multimedia content after receiving an acquisition instruction for the second multimedia content in the acquisition interface of the second multimedia content.

In some embodiments, the acquisition interface of the second multimedia content comprises a second sticker comprising the target information.

In some embodiments, display parameter(s) of the second sticker comprise at least one of a display mode, a display position, or a display duration of the second sticker.

In some embodiments, the method further includes: playing the second multimedia content and displaying the second sticker in a playing interface of the second multimedia content.

In some embodiments, the method further includes:
receiving an add-to-favorites instruction triggered on the first sticker, wherein the add-to-favorites instruction is used to add the target information in Favorites; and
adding the target information to the Favorites in response to the add-to-favorites instruction.

In a second aspect, the present disclosure provides an information replying apparatus, including:
a playing module for displaying first multimedia content comprises a first sticker comprising target information, wherein the target information is at least one of comment information or question information associated with original multimedia content, and the first multimedia content comprises multimedia content that replies to the target information;
a receiving module for receiving a first instruction triggered on the first sticker which instructs to create second multimedia content to reply to the target information; and
an acquisition module for, in response to receiving the first instruction, acquiring second multimedia content for replying to the target information.

In some embodiments, the receiving module is further used for receiving a second instruction triggered on the first sticker, the second instruction being used to instruct to view the target information;
the playing module is further used for switching to a playing interface of the target multimedia content in response to the second instruction, and displaying the target information and a comment card in a comment area of the playing interface of the target multimedia content, wherein the comment card comprises a thumbnail comprising a playing picture of the first multimedia content and the first sticker.

In some embodiments, the playing module is further used for displaying a link associated with the target information in the playing interface of the first multimedia content, wherein the link is used to trigger a display of the target information; and receiving a trigger operation on the link, switching to the playing interface of the target multimedia content, and displaying the target information and a comment card in the comment area of the playing interface of the target multimedia content, wherein the comment card comprises a thumbnail including a playing picture of the first multimedia content and the first sticker.

In some embodiments, the apparatus further includes:
an adding module for adding a link associated with the target information to the second multimedia content to obtain second multimedia content with the link added, wherein the link is used to trigger a display of the target information;
a transmitting module for uploading the second multimedia content with the link added to a server to display the link in a playing interface of the second multimedia content.

In some embodiments, the transmitting module is further used for uploading the second multimedia content to a server so that the server sends a notification message to at least one client associated with the target information, wherein the notification message is used to notify the at least one client that the target information has been replied in multimedia form.

In some embodiments, the playing module is further used for displaying an aggregation page of at least one multimedia content associated with the target information in the first sticker after receiving a third instruction for the first sticker.

In some embodiments, the first multimedia content is acquired after receiving a fourth instruction indicating a multimedia reply to the target information displayed in the comment area of the playing interface of the target multimedia content; or
the first multimedia content is acquired after receiving a fifth instruction indicating a multimedia reply to the target information displayed in a third sticker.

In some embodiments, the playing module is further used for switching to an acquisition interface of the second multimedia content in response to the first instruction;
the acquisition module is specifically used for acquiring the second multimedia content after receiving an acquisition instruction for the second multimedia content in the acquisition interface of the second multimedia content.

In some embodiments, the acquisition interface of the second multimedia content comprises a second sticker comprising the target information.

In some embodiments, display parameter(s) of the second sticker comprise at least one of a display mode, a display position, or a display duration of the second sticker.

In some embodiments, the playing module is further used for playing the second multimedia content and displaying the second sticker in a playing interface of the second multimedia content.

In some embodiments, the receiving module is further used for receiving an add-to-favorites instruction for the first sticker, wherein the add-to-favorites instruction is used to add the target information in Favorites;
the add-to-favorites module is used for adding the target information to the Favorites in response to the add-to-favorites instruction.

For the beneficial effects of the above second aspect and the information replying apparatus provided in each possible design of the above second aspect, reference can be made to the beneficial effects of the first aspect and each possible implementation of the first aspect, which will not be repeated herein.

In a third aspect, the present disclosure provides an electronic device, comprising: a memory and a processor; wherein the memory is used for storing program instructions; the processor is used to invoke the program instructions in the memory to cause the electronic device to implement the information replying method of the first aspect and any possible design of the first aspect.

In a fourth aspect, the present disclosure provides a non-transitory computer storage medium, including computer instructions that when executed on an electronic device, cause the electronic device to implement the information replying method in the first aspect and any possible design of the first aspect.

In a fifth aspect, the present disclosure provides a non-transitory computer program product that when executed on a computer, causes the computer to implement the information replying method in the first aspect and any possible design of the first aspect.

In a sixth aspect, the present disclosure discloses a chip system applied to an electronic device including a display, a memory and a sensor, the chip system including: a processor; when the processor executes computer instructions stored in the memory, the electronic device implements the information replying method of the first aspect and any possible design of the first aspect.

BRIEF DESCRIPTION OF THE DRAWINGS

Herein, the accompanying drawings, which are incorporated in and constitute a part of this specification, illustrate embodiments of the present disclosure and, together with the description, serve to explain the principles of the present disclosure.

In order to more clearly explain the embodiments of the present invention or the technical solutions in the prior art, a brief introduction will be given below for the drawings required to be used in the description of the embodiments or the prior art. It is obvious that, for a person skilled in the art, he or she may also acquire other drawings according to such drawings on the premise that no inventive effort is involved.

DETAILED DESCRIPTION

Figure 1C:
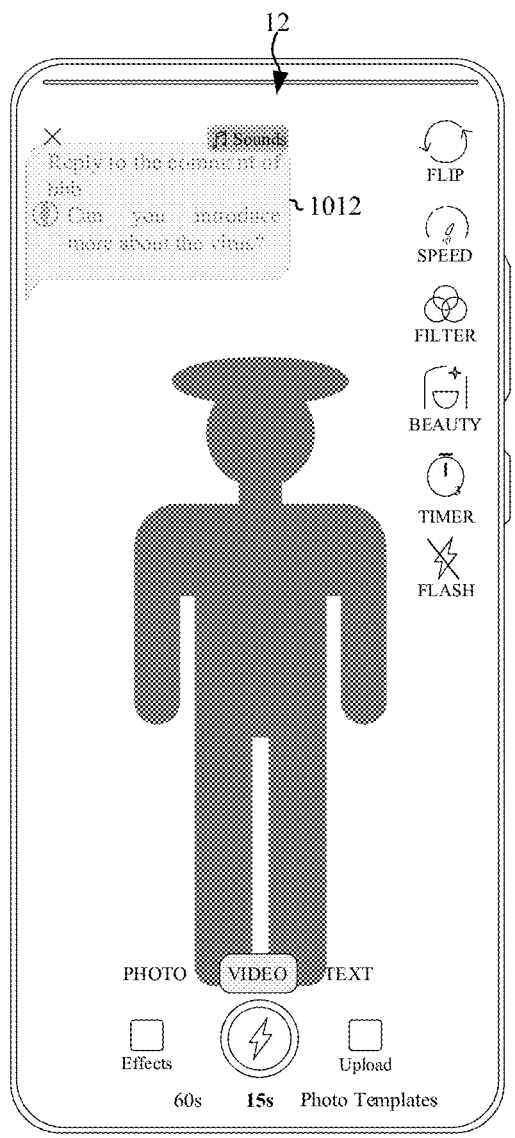
FIGS. 1A-1N are schematic diagrams of human-computer interaction interfaces provided by an embodiment of the present disclosure.

In order to better understand the above objects, features and advantages of the present disclosure, the scheme of the present disclosure will be further described below. It should be noted that, in the case of no conflict, the embodiments and the features of the embodiments of the present disclosure may be combined with each other.

Many specific details are set forth in the following description to facilitate a full understanding of the present disclosure, but the present disclosure can also be implemented in other ways different from those described herein. Obviously, embodiments described in the description are only some embodiments of the present disclosure, and are not all of embodiments thereof.

There is only a single and inflexible replying method in the prior art, which may affect the user's interest in making a reply.

Illustratively, the present disclosure provides an information replying method, a device, an electronic device, a computer storage medium and a computer program product, capable of, displaying a sticker including target information while playing replied multimedia content after replying target information in multimedia form. Thus, the sticker can be used as a new entry to reply to the target information in multimedia form, the target information can be further replied in multimedia form, which is conducive to enriching the way of information replying, improving the interest of users in information replying, and increasing the chance of users creating and publishing multimedia contents.

In addition, the sticker can also be used as a new entry for viewing the target information and/or information associated with the target information, enabling quick viewing of the target information and the information associated with the target information, which is beneficial to reducing the complexity of user operations and improving the readability of the replied messages.

In addition, the sticker can also be used as a new entry for adding the target information and/or the information associated with the target information in the Favorites, enabling quick favoriting of the target information and the information associated with the target information, which is beneficial to reducing the complexity of user operations and improving the convenience of viewing the target information.

In some embodiments, replying to the target information in multimedia form mentioned in the present disclosure can be understood as replying to the target information using multimedia content, or replying to the target information using multimedia content and a link associated with the target information, or replying to the target information using multimedia content, a link associated with the target information, and a text reply content. In some embodiments, the multimedia content mentioned in this disclosure includes, but is not limited to at least one of audio or video.

In some embodiments, the target information mentioned in this disclosure includes information such as comments, replies, or questions to the target multimedia content. In some embodiments, the target information may include at least one of comment information, reply information, or question information. The target information can be expressed using text, emoticons, pictures, links, animations, symbols, numbers, time, etc. In addition, the target information can also be expressed in sentences such as statements, questions or exclamations.

In some embodiments, the target multimedia content mentioned in the present disclosure is multimedia content, which may include at least one of audio or video. In some embodiments, the playing interface of the target multimedia content may be represented by at least one frame of a video if the target multimedia content includes the video. The playing interface of the target multimedia content may be represented by a picture displayed for the audio within a preset duration if the target multimedia content includes an audio. In addition, the playing interface of the target multimedia content may be displayed in a static or dynamic manner.

In some embodiments, the client can implement the information replying method of the present disclosure with an electronic device, or an application (APP) or web page on an electronic device, etc. The electronic device can include a mobile phone, a tablet computer, a wearable electronic device, an on-board device, an augmented reality (AR)/virtual reality (VR) device, a notebook computer, an ultra mobile personal computer (UMPC), a netbook, a personal digital assistant (PDA), and smart home equipment such as a smart TV, a smart screen, a HDTV, a 4K TV, a smart speaker, and a smart projector. The present disclosure is not limited to any specific type of the electronic device.

In some embodiments, the type of the operating system of the electronic device is not limited in the present disclosure. For example, it may be Android, Linux, Windows, IOS, etc.

Based on the above description, in conjunction with FIGS. 1A to 1N, and taking a case where the electronic device is a mobile phone, the client installed on the mobile phone is a video type App (hereinafter referred to as application 1), the target information is comment information 1, and the target multimedia content is video 0 as an example, a specific implementation of the information replying method provided by the present disclosure will be introduced in detail below.

Figure 1D:
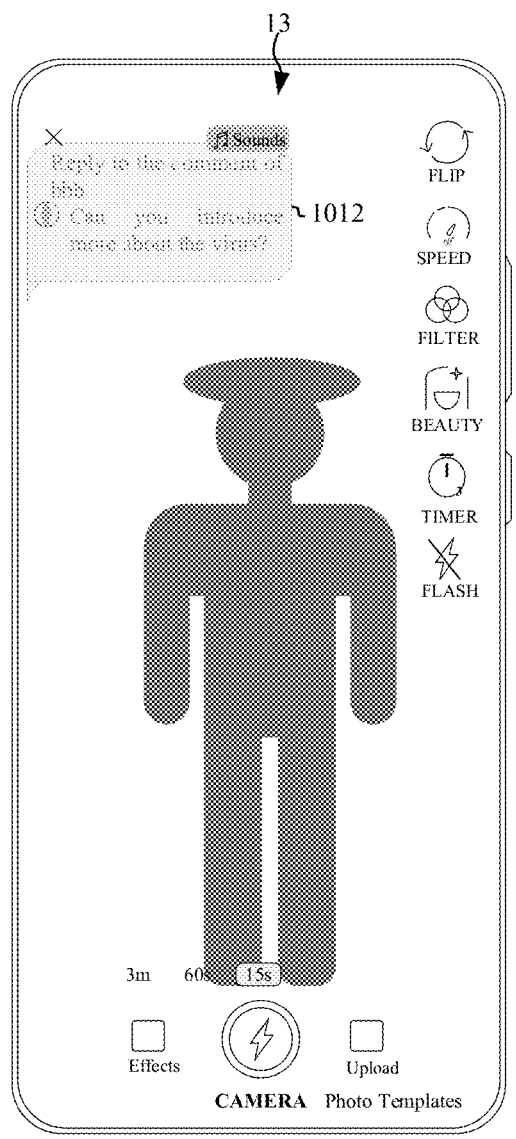
Figure 1E:
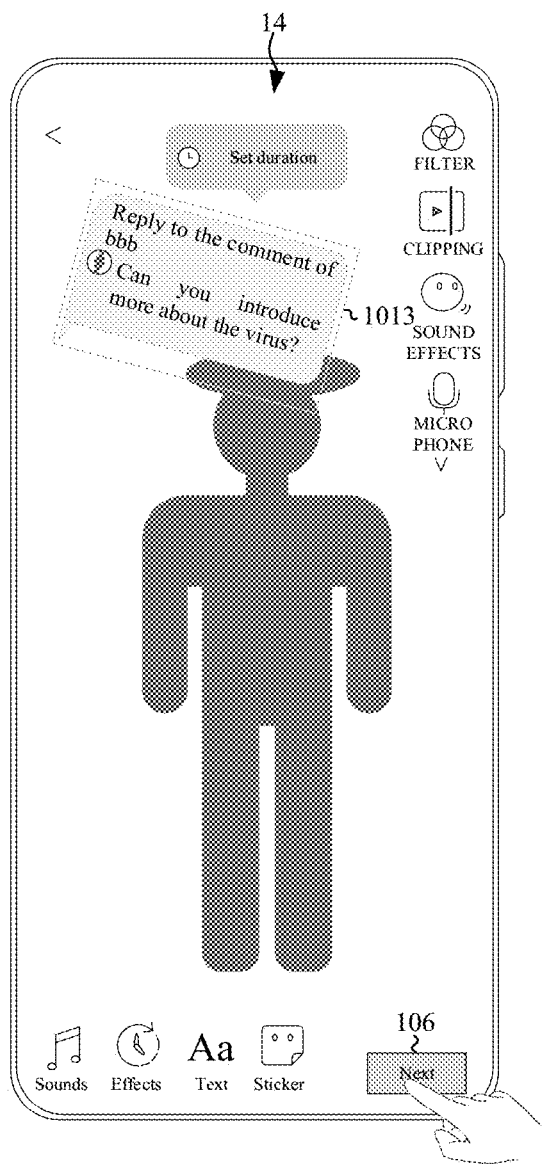
Figure 1F:
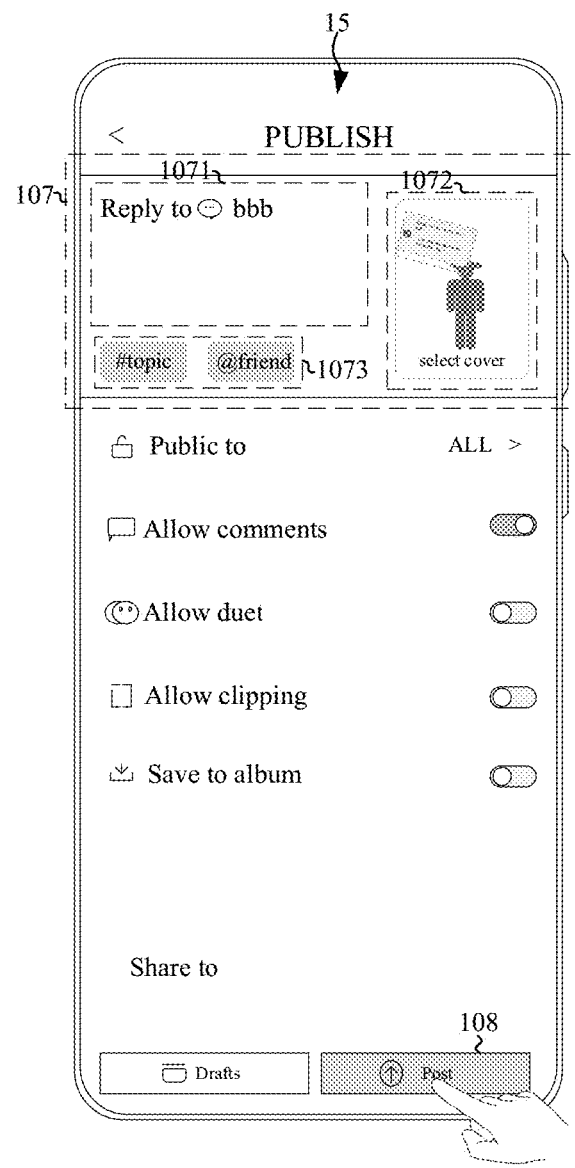
Figure 1G:
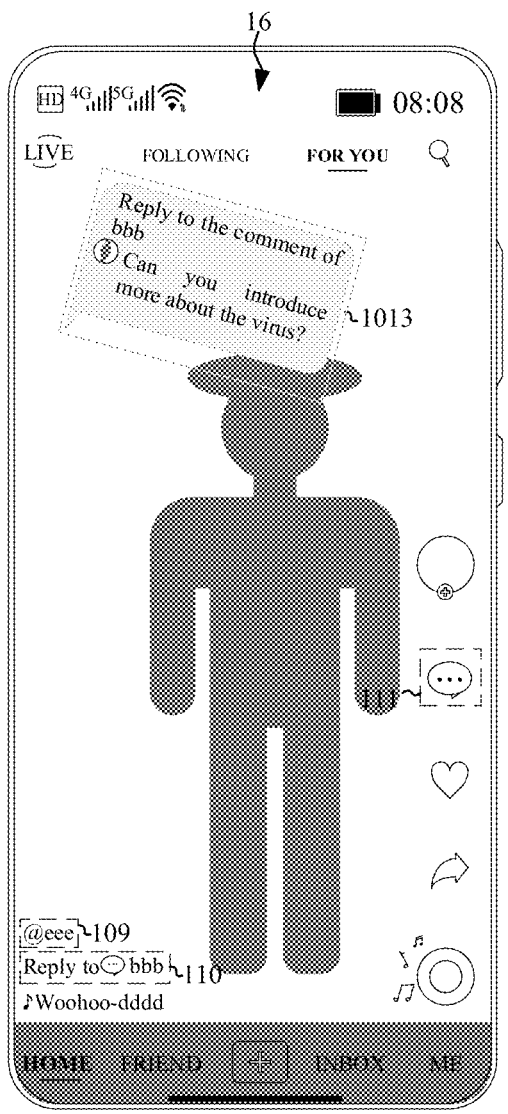
Figure 1H:
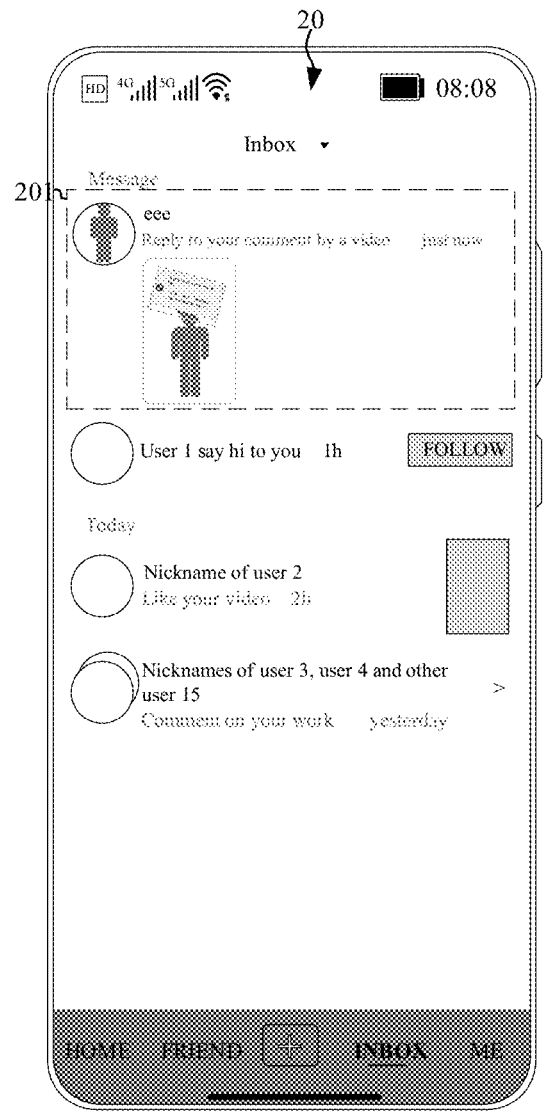
Figure 1I:
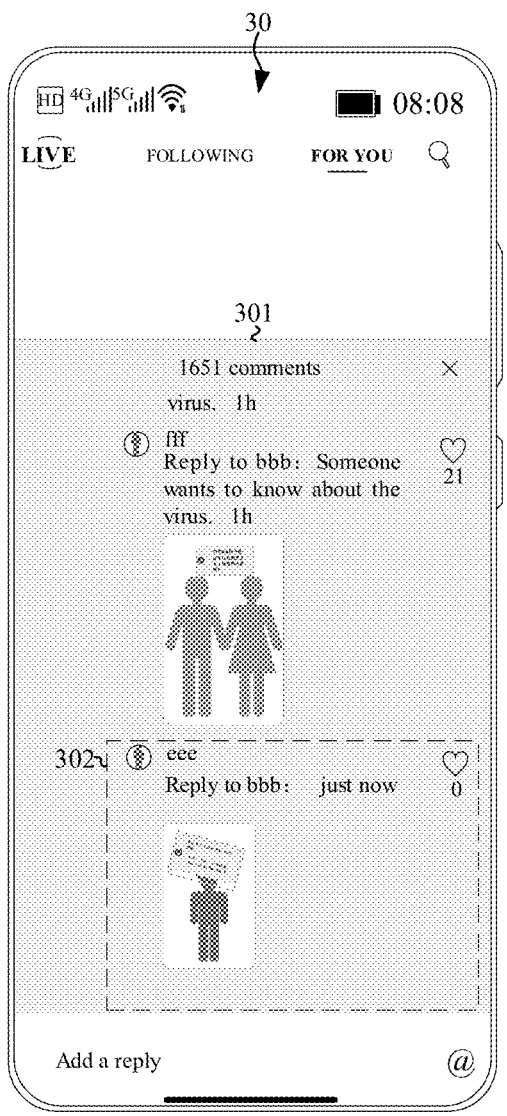
Figure 1J:
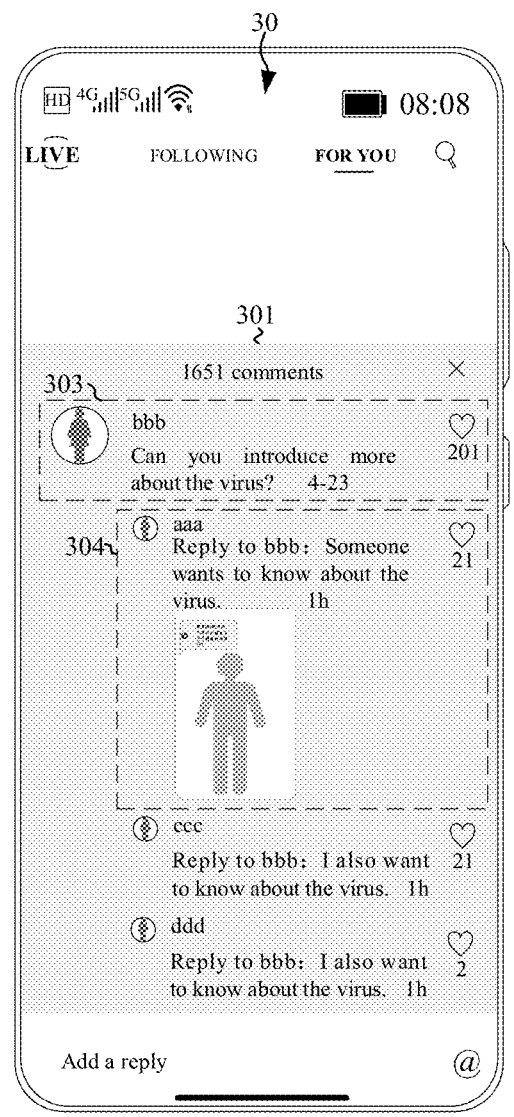
Figure 1K:
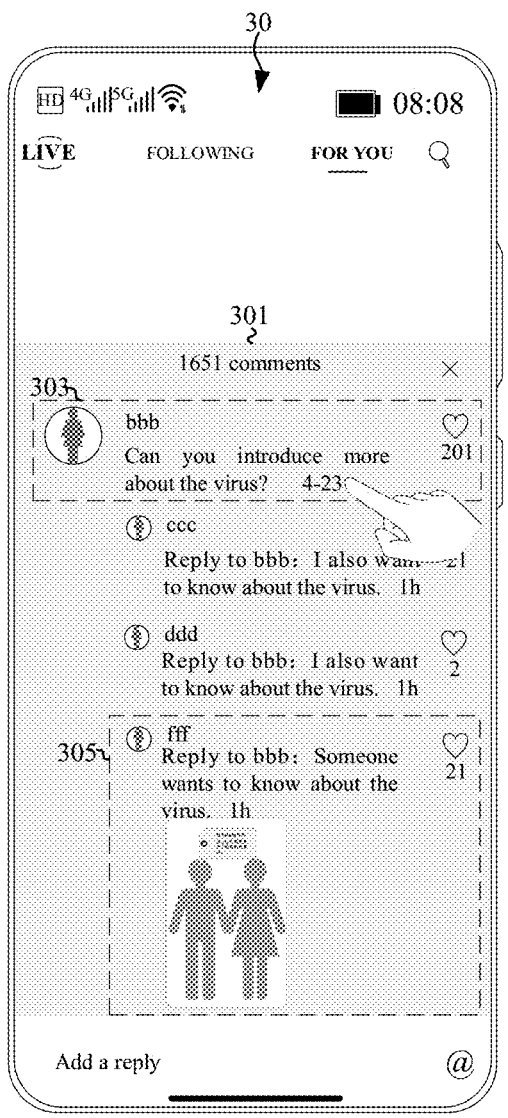
Figure 1L:
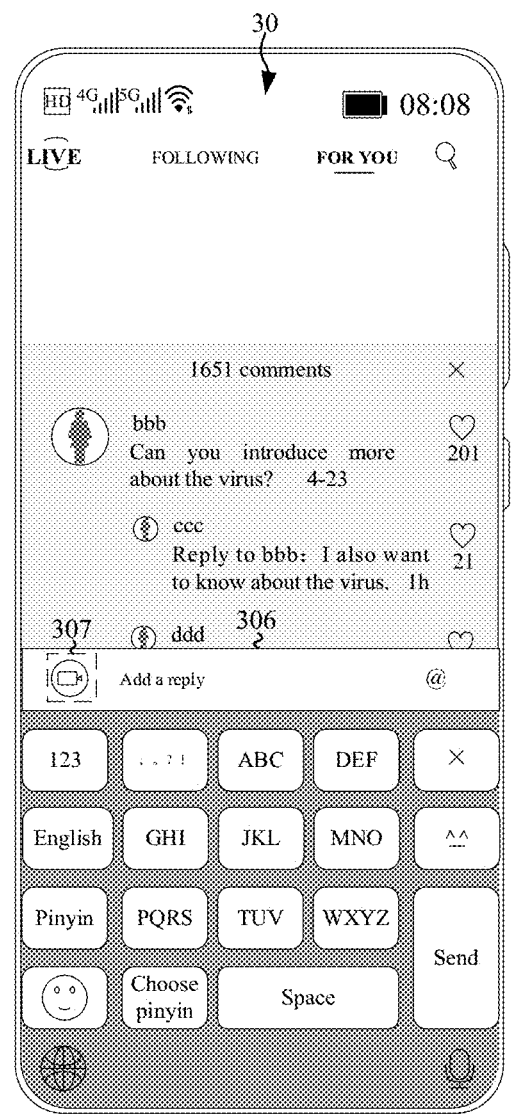
Figure 1M:
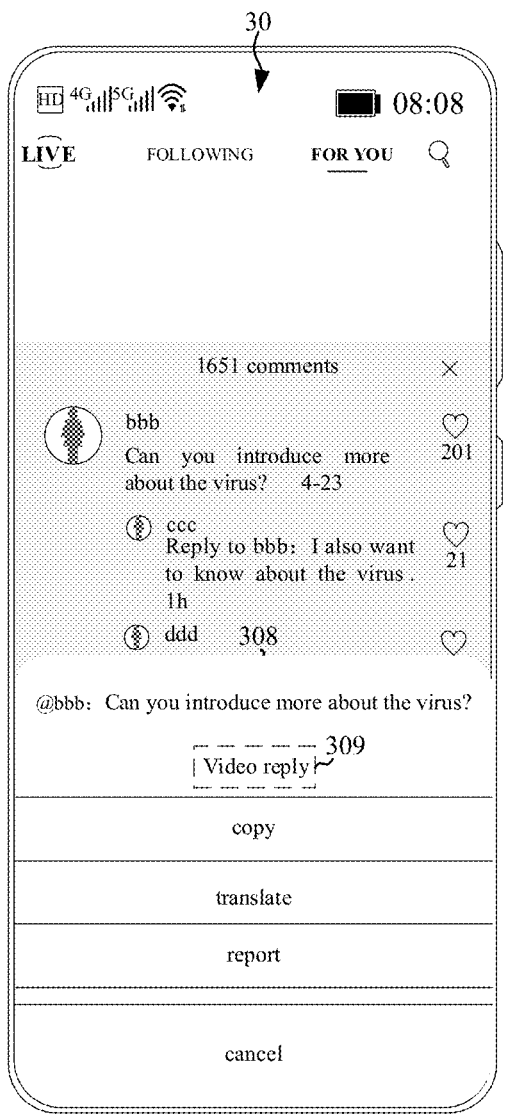
Figure 1N:
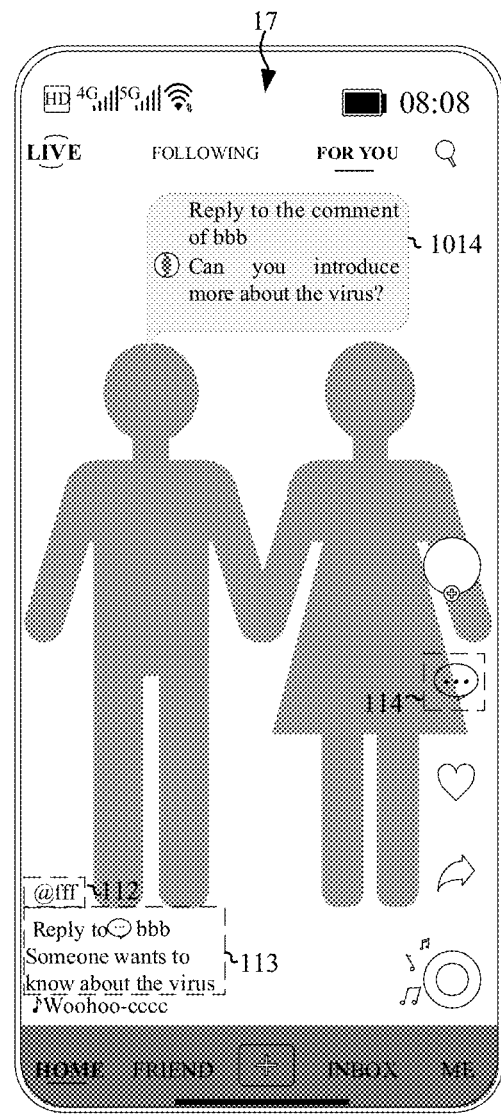

Referring to FIGS. 1A to 1N, these figures are human-computer interaction interfaces provided by some embodiments of the present disclosure. In FIGS. 1A to 1N, comment information 1 is issued by user 2; video 1 is published by user 1, and sticker 1, video 1, comment information 3, comment card 2 and text reply content 1 are associated with each other; video 2 is published by user 3, and video 2, sticker 2, comment information 2, comment card 1 and text reply content 2 are associated with each other; video 3 is published by user 4, and video 3, sticker 3, comment information 4, comment card 3 and text reply content 3 are associated with each other.

Taking the mobile phone in a portrait state as an example, application 1 can display a user interface 11 shown in FIG. 1A on the mobile phone. User interface 11 is used to display a playing page in application 1, in which multimedia content, such as video 1, can be played. Moreover, user interface 11 is also used to display sticker 1 including comment information 1.

In some embodiments, video 1 is multimedia content that replies to comment information 1 in multimedia form. Comment information 1 is associated with video 0. Comment information 1 is information on comments/replies/questions about video 0. Sticker 1 can be used as an entry to make a further reply to comment information 1 in multimedia form. Moreover, the implementation of user interface 11 is not specifically limited in the present disclosure.

In some embodiments, video 1 is published by user 1. As an example of the present disclosure, user 1 has an account nickname "aaa". Comment information 1 is issued by user 2. As an example, comment information 1 may be "Can you introduce more about the virus?" User 2 of the disclosure has an account nickname "bbb".

In FIG. 1A, user interface 11 may further include a control 1011 and an area 102.

Control 1011, for example, may be in a nontransparent state for displaying sticker 1 including comment information 1 and providing an entry to reply to comment information 1 in multimedia form. In addition, control 1011 is also used to provide an entry to view comment information 1 and/or information associated with comment information 1, and/or add comment information 1 and/or information associated with comment information 1 to the Favorites.

In some embodiments, the way of displaying sticker 1 such as its shape, color and dynamic effect, and its display parameters such as its display position and display duration are not specifically limited in the present disclosure. In some embodiments, sticker 1 is displayed at a position such that it does not block the playback screen of video 1 completely or as much as possible.

In some embodiments, the way of displaying comment information 1 using sticker 1 is not specifically limited in the present disclosure. In some embodiments, sticker 1 can display related data of comment information 1, such as an account avatar of the publisher, an account nickname of the publisher (for example, "bbb" in FIG. 1A) and the specific content (for example, "Can you introduce more about the virus?" in FIG. 1A). The specific content of comment information 1 can be displayed as text or a picture in full or in an abbreviated manner.

Area 102 is used to remind the publisher of video 1 (i.e., user 1). For example, area 102 can be reminded in the form of "@+account nickname of user 1". In addition, application 1 can switch from user interface 11 to an account page of user 1 after receiving a trigger operation such as a click on area 102 by the user. The way of displaying area 102 is not specifically limited in the present disclosure.

Furthermore, user interface 11 in FIG. 1A may further include an area 103 and a control 104.

Area 103 is used for displaying a link associated with comment information 1, wherein the link is used to trigger the display of comment information 1. The way of displaying the link is not specifically limited in the present disclosure. In some embodiments, the link can be displayed in the form of "reply to +reply identification+account nickname of the publisher (i.e., user 2) of comment information 1". In some embodiments, the reply identification can be represented in the form of an icon, a symbol, text, or a picture. In addition, the way of displaying comment information 1 upon triggering the link is not specifically limited in the present disclosure. In some embodiments, the link is used to trigger the display of comment information 1 in a comment area on the playing interface of video 0.

In addition, area 103 is also used to display text reply content 1 replied by the user when replying to comment information 1 in multimedia form. For example, for comment information 1 "Can you introduce more about the virus?" included in control 1011, text reply content 1 such as "Someone wants to know about the virus" can be displayed.

Control 104 is used for triggering the display of a comment area on the playing interface of video 1. In some embodiments, the comment area on the playing interface of video 1 is used to display information on comments/replies/questions about video 1, which can take the form of text, symbols, pictures, moving pictures and so on. In some embodiments, the comments, replies or questions can be about, but are not limited to: the playing interface of video 1, sticker 1, comment information 1, questions about video 1, and reply information of comment information 1.

To sum up, in addition to providing an entry to make a comment or reply, or ask a question about comment information 1 through control 104, application 1 can provide a reply to comment information 1 in multimedia form through control 1011, thereby enriching the way of replying comment information 1.

Application 1 may display an exemplary control 105 shown in FIG. 1B on user interface 11 after receiving an operation such as a click on control 1011 performed by the user on user interface 11 shown in FIG. 1.

In FIG. 1B, control 105 may include an option 1051 for providing an entry to make a reply to comment information 1 in multimedia form. In some embodiments, option 1051 can be represented by an identification, text, etc. In some embodiments, option 1051 is displayed at a position such that it does not block the playback of video 1 completely or as much as possible.

After receiving an operation such as a clicking option 1051 performed by the user on control 105 shown in FIG. 1B, application 1 can display an exemplary user interface 12 of FIG. 1C, or an exemplary user interface 13 of FIG. 1D on the mobile phone.

In some embodiments, user interface 12 or 13 is used to display a photographing page in application 1. Two types of photographing page are shown in user interfaces 12 and 13. The photographing page can be used to acquire a multimedia content, such as video 2, through real-time acquisition, from application 1, or from a memory module other than application 1. The implementation of user interfaces 12 and 13 is not specifically limited in the present disclosure.

In FIGS. 1C and 1D, user interfaces 12 and 13 may include a control 1012 for displaying a sticker 2 including comment information 1 formed based on sticker 1, and prompting the user to reply to comment information 1 in multimedia form.

In some embodiments, the way of implementing control 1012 is not specifically limited in the present disclosure. For the specifically implementation of control 1012, reference can be made to the description of control 1011 in FIG. 1A, which will not be described herein.

In addition, on user interface 12 or 13, display parameters of sticker 2 cannot be adjusted by triggering control 1012, so that control 1012 cannot be adjusted through operations such as moving, deleting, resizing, setting the display duration, display transparency, or rotating. In some embodiments, control 1012 may be displayed in a fix and translucent manner in a preset position of user interface 12 or 13, indicating that control 1012 cannot be triggered by the user.

Application 1 can display an exemplary user interface 14 shown in FIG. 1E on the mobile phone after acquiring video 2 through user interface 12 or 13. User interface 14 is used to edit the acquired video 2.

In some embodiments, user interface 14 can further be used to obtain display parameters of sticker 2, such as its display mode, display position and display duration. The implementation of user interface 14 is not specifically limited in the present disclosure.

In FIG. 1E, user interface 14 may include control 1013 for displaying sticker 2 including comment information 1, wherein control 1013 can be triggered by operations such as moving, deleting, resizing, setting the display duration and display transparency, or rotating control 1013 to adjust the display parameters of sticker 2.

In some embodiments, the way of implementing control 1013 is not specifically limited in the present disclosure. In some embodiments, control 1013 can be displayed non-transparently on user interface 14. Thus, through comparing the transparency of control 1012 and the transparency of control 1013, it is convenient for the user to distinguish whether the display parameters of sticker 2 can be adjusted.

In some embodiments, the way of displaying sticker 2 such as its shape, color and dynamic effect, and the display parameters such as the display position and the display duration are not specifically limited in the present disclosure. In some embodiments, sticker 2 is displayed at a position such that it does not block the playback of video 2 completely or as much as possible.

In some embodiments, the way of displaying comment information 1 using sticker 2 is not specifically limited in the present disclosure. In some embodiments, sticker 2 can display the related data of comment information 1, such as an account avatar of the publisher, and an account nickname of the publisher (for example, "bbb" in FIG. 1E) and the specific content (for example, "Can you introduce more about the virus?" in FIG. 1A). The specific content of comment information 1 can be displayed as text, pictures or moving pictures in full or in an abbreviated manner.

User interface 14 in FIG. 1E may further include control 106 for triggering the display of a publishing page in application 1.

In some embodiments, a link associated with comment information 1 can be added and displayed in the publishing page, wherein the link is used to trigger the display of comment information 1. The way of displaying the link is not specifically limited in the present disclosure. In some embodiments, for the specific implementation of the link, reference can be made to the description of the link associated with comment information 1 in area 103 shown in FIG. 1A.

In addition, in the publishing page, the transmission of at least video 2 and the link associated with comment information 1 to a server can be triggered. In addition, the transmission of the display parameters of sticker 2 to a server can also be triggered in the publishing page. It should be noted that if the display parameters of sticker 2 are all default values, it is not necessary to trigger the transmission of the display parameters of sticker 2 to the server in the publishing page.

In addition, in the publishing page, text reply content 2 replied by the user when replying to comment information 1 in multimedia form can also be added and displayed, and the transmission of video 2, the display parameters of sticker 2, the link associated with comment information 1 and text reply content 2 to the server can be triggered.

Application 1 can acquire at least the video 2 after receiving an operation performed by the user on user interface 14 shown in FIG. 1E, such as a click on control 106. Thus, application 1 can display an exemplary user interface 15 shown in FIG. 1F on the mobile phone.

In some embodiments, user interface 15 is used to display the publishing page. The implementation of user interface 15 is not specifically limited in the present disclosure.

In FIG. 1F, user interface 15 may include an area 107 and a control 108.

Area 107 may include areas 1071, 1072 and 1073.

Area 1071 is used to display the link associated with comment information 1 in the form of "reply to +reply identification+account nickname of the publisher of comment information 1 (i.e., user 2)" for example, and provide a user input window for inputting a text reply content, and display text reply content 2 replied by the user in the user input window.

Area 1072 is used to display a cover of video 2, for example, a thumbnail comprising a frame of playing picture of video 2 (such as a cover of video 2 or a frame of video 2) and sticker 2 displayed on the above playing picture in the form of a card, and provide the function of selecting a cover for video 2.

Area 1073 is used to provide an entry to select a topic to which video 2 belongs, so that the topic to which video 2 belongs can be displayed in area 1071, and to provide an entry to select a specific user, so as to remind the specific user to watch video 2.

Control 108 is used to publish related information of video 2. That is, application 1 can send at least video 2 and the link associated with comment information 1 to the server, and can also send at least one of the display parameters of sticker 2 or text reply content 2 to the server.

It should be noted that in addition to area 107 and control 108, user interface 15 can also be used to provide an entry to grant permission to view video 2, comment on video 2, edit video 2, share video 2, and to specify whether to save video 2 in application 1, whether to save video 2 in the Drafts and so on, which is not specifically limited in the present disclosure.

Application 1 can transmit relevant information of video 2 to a server after receiving an operation performed by the user on user interface 15 shown in FIG. 1F, such as a click on control 108.

Thus, application 1 can display an exemplary user interface 16 shown in FIG. 1G on the mobile phone for displaying video 2 after the application 1 receives relevant information of video 2 from the server. The implementation of user interface 16 is not specifically limited in the present disclosure.

Thus, after receiving an operation from a user (i.e., user 3) replying to comment information 1 in multimedia form, application 1 can obtain video 2 and display sticker 2 including comment information 1 on the playing interface of video 2.

In FIG. 1G, user interface 16 may include a control 1013 and an area 109.

Control 1013 is used to display sticker 2 including comment information 1 and provide an entry to reply to comment information 1 in multimedia form. In addition, control 1013 is also used to provide an entry to view at least one of comment information 1 or information related to comment information 1 and/or add at least one of comment information 1 or information related to comment information 1 into the Favorites.

In some embodiments, for the specific implementation of control 1013, reference can be made to the description of control 1011 in FIG. 1A, and after control 1013 is triggered, application 1 can also display an exemplary control 105 shown in FIG. 1B to realize the process of obtaining a video and a sticker after triggering the reply to comment information 1 in multimedia form. For its specific implementation process, reference can be made to the description of obtaining a video and a sticker after triggering the reply to comment information 1 in multimedia form as shown in FIG. 1B, which will not be repeated herein.

Area 109 is used to show the publisher of video 2 (i.e., user 3 who created video 2) in the form of "@+account nickname of user 3", for example. As an example of the present disclosure, the account nickname of user 3 may be "eee". In addition, application 1 can switch from user interface 16 to an account page of user 3 after receiving a trigger operation such as a click on area 109 performed by the user.

Furthermore, user interface 16 in FIG. 1G may further include an area 110 and a control 111.

Area 110 is used for displaying a link associated with comment information 1, wherein the link is used to trigger the display of comment information 1. The way of displaying the link is not specifically limited in the present disclosure. In some embodiments, the link can be displayed in the form of "reply to +reply identification+account nickname of the publisher (i.e., user 2) of comment information 1". In some embodiments, the reply identification can be represented in the form of an icon, a symbol, text, or a picture etc. In addition, the way of displaying comment information 1 upon triggering the link is not specifically limited in the present disclosure. In some embodiments, the link is used to trigger the display of comment information 1 in a comment area on the playing interface of video 0.

In addition, area 110 can also be used to display text reply content 2 replied by the user when replying to comment information 1 in multimedia form.

Control 111 is used for triggering the display of a comment area on the playing interface of video 2. In some embodiments, the comment area on the playing interface of video 2 is used to display information on comments/replies/questions about video 2, which can take the form of text, symbols, pictures, moving pictures and so on. In some embodiments, comments, replies or questions can be made or asked on, but not limited to: the playing interface of video 2, sticker 2 displayed in the playing interface of video 2, comment information 1, and information in the comment area on the playing interface of video 2.

To sum up, in addition to providing an entry to make a comment or reply, or ask a question about comment information 1 through control 111, application 1 can provide a reply to comment information 1 in multimedia form through control 1013, thereby enriching the way of replying comment information 1.

After the server receives, from the application 1, relevant information of video 2 that is a reply made by the user to comment information 1 in multimedia form, the server can send notification information 1 to a client associated with comment information 1.

In some embodiments, the client associated with comment information 1 may include, but is not limited to: a client on which comment information 1 is published, a client on which a like is given to comment information 1, a client on which comment information 1 is commented/replied/questioned, a client on which video 0 corresponding to comment information 1 is published, a client on which a like is given to video 0 corresponding to comment information 1, and a client on which video 0 corresponding to comment information 1 is commented/replied.

In some embodiments, notification message 1 is used to notify one or more of the above clients that comment information 1 has been replied in multimedia form. The specific implementation of notification message 1 and the way of displaying notification message 1 on the client are not specifically limited in the present disclosure.

Thus, taking the publisher of video 0 as an example, after application 1 receives notification message 1 from the server, application 1 can display an exemplary user interface 20 shown in FIG. 1H on the mobile phone of the publisher of video 0.

In some embodiments, user interface 20 is used to display a notification page in application 1. The notification page is a page in application 1. The notification page is used to display notification messages such as receiving information, adding to the Favorites, giving a like, comments, etc. The implementation of the notification page and user interface 20 is not specifically limited in the present disclosure.

In FIG. 1H, user interface 20 may include area 201 used to display notification message 1 in the notification page. If notification message 1 represents that user 3 created video 2 as a video reply to comment information 1, notification message 1 can be displayed in the form of "account avatar of user 3, account nickname of user 3, reply text identification, reply time and notification card", for example. In some embodiments, the notification card may include: a thumbnail composed of or comprising a frame of playing picture of video 2 (such as a cover of video 2 or a frame of video 2) and sticker 2, wherein sticker 2 is displayed floating on the above picture.

To sum up, application 1 can also send notification message 1 to a client associated with comment information 1 through the server, so that a relevant user can know in time that a user has replied to comment information 1 in multimedia form.

After receiving an operation performed by the user on user interface 15 shown in FIG. 1F, such as a click on control 108, comment information 2 associated with video 2 and relevant information of comment information 1 can be displayed in a comment area on playing interface of video 0.

In some embodiments, comment information 2 includes relevant information that a user replied to comment information 1 in multimedia form. The implementation of comment information 2 is not specifically limited in the present disclosure. In some embodiments, comment information 2 may include: an account nickname of the publisher of video 2, an account avatar of the publisher of video 2, the publisher of comment information 1, and comment card 1. In some embodiments, comment card 1 may include a thumbnail composed of or comprising a frame of playing picture of video 2 and sticker 2. In addition, comment information 2 may further include text reply content 2.

Thus, application 1 can display an exemplary user interface 30 shown in FIG. 1I on the mobile phone.

In some embodiments, user interface 30 is used to play video 0, that is, user interface 3 is the playing interface of video 0, and displays the comment area of the playing interface of video 0. The implementation of user interface 30 is not specifically limited in the present disclosure.

In FIG. 1I, user interface 30 may include a window 301 for displaying the comment area of the playing interface of video 0. In some embodiments, window 301 may include an area 302 for displaying comment information 2 in the comment area of the playing interface of video 0.

To sum up, after a user replied to comment information 1 in multimedia form with video 2, application 1 can display comment information 2 associated with video 2 and comment information 1 in the comment area of the playing interface of video 0, so that information associated with comment information 1 can be centrally displayed, thereby improving the quickness of replying to comment information 1.

It should be noted that application 1 can display an exemplary user interface 16 shown in FIG. 1G, that is, a user interface 16 for playing video 2, on the mobile phone after receiving a user's operation such as a click on area 302 in window 301 shown in FIG. 1I. Moreover, in addition to displaying comment information 2, user interface 30 in FIG. 1I may further include an area where comment information 1 is displayed, so that comment information 1 and comment information 2 are displayed together, which is convenient for the user to understand the relationship therebetween in time.

In some embodiments, at least one of comment information 1 or the information associated with comment information 1 can also be viewed through control 1011.

In FIG. 1B, control 105 may further include an option 1052 for providing an entry to view at least one of comment information 1 or the information associated with comment information 1. In some embodiments, option 1052 can be represented by an identification or text, etc. Also, option 1052 is displayed at a position such that it does not block the playing picture of video 1 completely or as much as possible.

Application 1 may display an exemplary user interface 30 shown in FIG. 1J on the mobile phone after receiving an operation such as a click on operation 1052 performed by the user on control 105 shown in FIG. 1B.

In some embodiments, user interface 30 is used to display the comment area of the playing interface of video 0, which is convenient for viewing comment information 1. The implementation of user interface 30 is not specifically limited in the present disclosure.

In FIG. 1J, user interface 30 may include a window 301 for displaying the comment area of the playing interface of video 0. In some embodiments, window 301 may include an area 303 for displaying comment information 1 in the comment area of the playing interface of video 0.

To sum up, application 1 can provide an entry to view comment information 1 and/or the information associated with comment information 1 through control 1011, which is convenient to view comment information 1 and/or the information associated with comment information 1, thereby improving the convenience of operation.

In addition, window 301 may further include an area 304 for displaying comment information 3 associated with video 1 and comment information 1 in the comment area of the playing interface of video 0. In some embodiments, comment information 3 includes relevant information that a user replied to comment information 1 in multimedia form. The implementation of comment information 3 is not specifically limited in the present disclosure. In some embodiments, comment information 3 may include at least one of: an account nickname of the publisher of video 1, an account avatar of the publisher of video 1, the publisher of comment information 1, or comment card 2. In some embodiments, comment card 2 may include a thumbnail composed of or comprising a frame of playing picture of video 1 and sticker 1. In addition, comment information 3 may further include text reply content 1.

To sum up, while application 1 displays comment information 1 in the comment area of the playing interface of video 0, it can also display comment information 3 obtained by replying to comment information 1 in multimedia form, so that the user can comprehensively view comment information 1 and the information associated with comment information 1.

It should be noted that after receiving the user's operation such as a click on area 304 in window 301 shown in FIG. 1J, application 1 can display an exemplary user interface 11 shown in FIG. 1A on the mobile phone, and play video 1 on user interface 11 and display sticker 1 on the playing interface of video 1, wherein sticker 1 includes comment information 1.

In addition, user interface 30 in FIG. 1I is the same user interface as user interface 30 in FIG. 1J, and window 301 in FIG. 1I is the same window as window 301 in FIG. 1J. If user 3 has replied to comment information 1 in multimedia form and obtained video 2, after receiving a slide operation such as an upward sliding or downward slide performed by the user in window 301 shown in FIG. 1I, application 1 can display the exemplary user interface 30 shown in FIG. 1J on the mobile phone, for example, to display areas 303 and 304.

Since comment information 1 can be displayed in different positions in application 1, application 1 can obtain video 1 based on comment information 1 displayed in different positions in application 1.

In some embodiments, taking comment information 1 displayed in the comment area of the playing interface of video 0 as an example, application 1 can display window 301 in the exemplary user interface 30 shown in FIG. 1K on the mobile phone.

In some embodiments, window 301 may include an area 303 for displaying comment information 1 in the comment area of the playing interface of video 0. In addition, video 0 is played in user interface 30.

In some embodiments, for the specific implementation of user interface 30, window 301 and area 303, reference can be made to the description of FIGS. 1I and 1J, which will not be described herein. Window 301 shown in FIG. 1K differs from window 301 shown in FIG. 1J in that window 301 shown in FIG. 1K does not include comment information 2, while window 301 shown in FIG. 1J includes comment information 2, that is, application 1 can display window 301 shown in FIG. 1K if the user does not trigger a reply to comment information 1 in multimedia form. Application 1 can display window 301 shown in FIG. 1J after the user triggers a reply to comment information 1 in multimedia form and obtains video 1.

After receiving an operation such as a click on area 303 performed by the user in window 301 shown in FIG. 1K, application 1 may display an exemplary window 306 shown in FIG. 1L on user interface 30.

In some embodiments, window 306 may include a control 307 for triggering a reply to comment information 1 in multimedia form. The implementation of control 307 is not specifically limited in the present disclosure. In some embodiments, control 307 may represented by text, identification, an icon, an image, etc.

Application 1 can obtain relevant information of video 1 after receiving an operation performed by the user in window 306 shown in FIG. 1L, such as a click on control 307. For its specific implementation, reference can be made to the description of obtaining relevant information of video 2 in FIGS. 1C to 1F, which will not be repeated herein.

Thus, after application 1 receives relevant information of video 1 from the server, application 1 can display an exemplary user interface 11 shown in FIG. 1A on the mobile phone. Alternatively, after receiving an operation such as a long press on area 303 performed by the user in window 301 shown in FIG. 1K, application 1 may display an exemplary window 308 shown in FIG. 1M on user interface 30.

In some embodiments, window 308 may include a control 309 for triggering a reply to comment information 1 in multimedia form. The implementation of control 309 is not specifically limited in the present disclosure. In some embodiments, control 309 may represented by text, identification, an icon, an image, etc.

Application 1 can obtain relevant information of video 1 after receiving an operation performed by the user in window 308 shown in FIG. 1M, such as a click on control 309. For its specific implementation, reference can be made to the description of obtaining relevant information of video 2 in FIGS. 1C to 1F, which will not be repeated herein.

Thus, after application 1 receives relevant information of video 1 from the server, application 1 can display an exemplary user interface 11 shown in FIG. 1A on the mobile phone.

In some embodiments, taking comment information 1 displayed in sticker 3 on the playing interface of video 3 as an example, application 1 can display an exemplary user interface 17 shown in FIG. 1N on the mobile phone for displaying a playing page in application 1. The playing page can play multimedia content, for example, video 3. In addition, the playing page also displays sticker 3 including comment information 1.

In some embodiments, video 3 is multimedia content that replies to comment information 1 in multimedia form. Sticker 3 can be used as an entry to make a further reply to comment information 1 in multimedia form. Moreover, the implementation of user interface 17 is not specifically limited in the present disclosure.

In some embodiments, video 3 is published by user 4. As an example of the present disclosure, user 4 has an account nickname "fff".

In FIG. 1N, user interface 17 may further include a control 1014 and an area 112.

Control 1014, for example, may be in a nontransparent state for displaying sticker 3 including comment information 1 and providing an entry to reply to comment information 1 in multimedia form. In addition, control 1014 is further used to provide an entry to view at least one of comment information 1 or information associated with comment information 1, and/or add at least one of comment information 1 or information associated with comment information 1 to the Favorites.

In some embodiments, the way of displaying sticker 3 such as its shape, color and dynamic effect, and its display parameters such as its display position and display duration are not specifically limited in the present disclosure. In some embodiments, sticker 3 is displayed at a position such that it does not block the playing of video 3 completely or as much as possible.

In some embodiments, the way of displaying comment information 1 using sticker 3 is not specifically limited in the present disclosure. In some embodiments, sticker 3 can display related data of comment information 1, such as an account avatar of the publisher, and an account nickname of the publisher (for example, "bbb" in FIG. 1N) and the specific content (for example, "Can you introduce more about the virus?" in FIG. 1N). The specific content of comment information 1 can be displayed as text or a picture in full or in an abbreviated manner.

Area 112 is used to display the publisher of video 3 (i.e., user 4). For example, user 4 can be displayed in the form of "@+account nickname of user 4". In addition, application 1 can switch from user interface 17 to an account page of user 4 after receiving a trigger operation such as a click on area 112 performed by the user. The way of displaying area 112 is not specifically limited in the present disclosure.

Furthermore, user interface 17 in FIG. 1N may further include an area 113 and a control 114.

Area 113 is used for displaying a link associated with comment information 1, wherein the link is used to trigger the display of comment information 1. In some embodiments, the link can be displayed in the form of "reply to +reply identification+account nickname of the publisher (i.e., user 2) of comment information 1". In some embodiments, the reply identification can be represented in the form of an icon, a symbol, text, or a picture. In addition, the way of displaying comment information 1 upon triggering the link is not specifically limited in the present disclosure. In some embodiments, the link is used to trigger the display of comment information 1 in a comment area on the playing interface of video 0.

In addition, area 113 is also used to display text reply content 3 replied by the user when replying to comment information 1 in multimedia form. For example, for comment information 1 "Can you introduce more about the virus?" included in control 1014, text reply content 3 such as "Someone wants to know about the virus" can be displayed.

Control 114 is used to provide an entry to the comment area of the playing interface of video 3. In some embodiments, the comment area of the playing interface of video 3 is used to display information on comments/replies/questions about video 3, which can take the form of text, symbols, pictures, moving pictures and so on. In some embodiments, information on comments/replies/questions about video 3 may include, but not limited to, the playing interface of video 3, sticker 3, comment information 1, questions about video 3, and reply information of comment information 1, etc.

To sum up, in addition to providing an entry to make a comment or reply, or ask a question about comment information 1 through control 114, application 1 can provide an entry to reply to comment information 1 in multimedia form through control 1014, thereby enriching the way of replying comment information 1.

Application 1 can obtain relevant information of video 1 after receiving an operation performed by the user in user interface 17 shown in FIG. 1N, such as a click on control 1014. For its specific implementation, reference can be made to the description of obtaining relevant information of video 2 in FIGS. 1A to 1F, which will not be repeated herein.

Thus, after application 1 receives relevant information of video 1 from the server, application 1 can display an exemplary user interface 11 shown in FIG. 1A on the mobile phone.

It should be noted that after receiving a user's operation such as a click on area 113 in user interface 17 shown in FIG. 1N, application 1 can display window 301 in exemplary user interface 30 shown in FIG. 1K on the mobile phone.

In some embodiments, window 301 may include an area 305 for displaying comment information 4 in the comment area of the playing interface of video 0. It should be noted that comment information 4 includes an account nickname of the publisher of video 3, an account avatar of the publisher of video 3, the publisher of comment information 1, comment card 3, and text reply content 3, for example.

Thus, application 1 can switch between the comment area of the playing interface of video 3 and comment area of the playing interface of video 0, which can simplify the user's operation and facilitate the user to view the information and videos in time. In addition, user interface 11 in FIG. 1A may further include an area for triggering the display of an aggregation page associated with comment information 1 in the application 1.

In some embodiments, the implementation of this area is not specifically limited in the present disclosure. In some embodiments, this area may be an area where control 1011 is located, or this area may be displayed floating on area 102 and represented by an identification, text, etc.

In some embodiments, the aggregation page is a page in application 1. The aggregation page is used to display all multimedia contents associated with comment information 1. In the aggregation page, the display of the playing page of each multimedia content can be triggered. The implementation of the aggregation page is not specifically limited in the present disclosure.

Application 1 may display an aggregation page after receiving an operation such as a click on this area performed by the user on user interface 11 shown in FIG. 1A, so that the user can comprehensively browse all multimedia contents associated with comment information 1.

In addition, user interface 11 in FIG. 1A may further include an area for triggering a process of adding comment information 1 to the Favorites.

In some embodiments, the implementation of this area is not specifically limited in the present disclosure.

Application 1 may add comment information 1 to the Favorites after receiving an operation such as a click on this area performed by the user on user interface 11 shown in FIG. 1A, so that the user can browse comment information 1 in the Favorites page.

In addition, this area can be further used to trigger a process of adding information associated with comment information 1 to the Favorites. In some embodiments, information associated with comment information 1 may be information such as comment information 3 associated with video 1 and comment information 1. This area may be provided as an option (similar to option 1051 or 1053) appeared by triggering control 1011, or is displayed floating on area 102 and represented by an identification, text, etc.

Application 1 may add comment information 3 to the favorites after receiving an operation such as a click on this area performed by the user on user interface 11 shown in FIG. 1A, so that the user can browse comment information 3 in the Favorites page.

Based on the foregoing description, in this embodiment of the present disclosure, taking the client as an example, and in conjunction with the accompanying drawings and application scenarios, the information replying method provided in the present disclosure will be described in detail.

Figure 2:
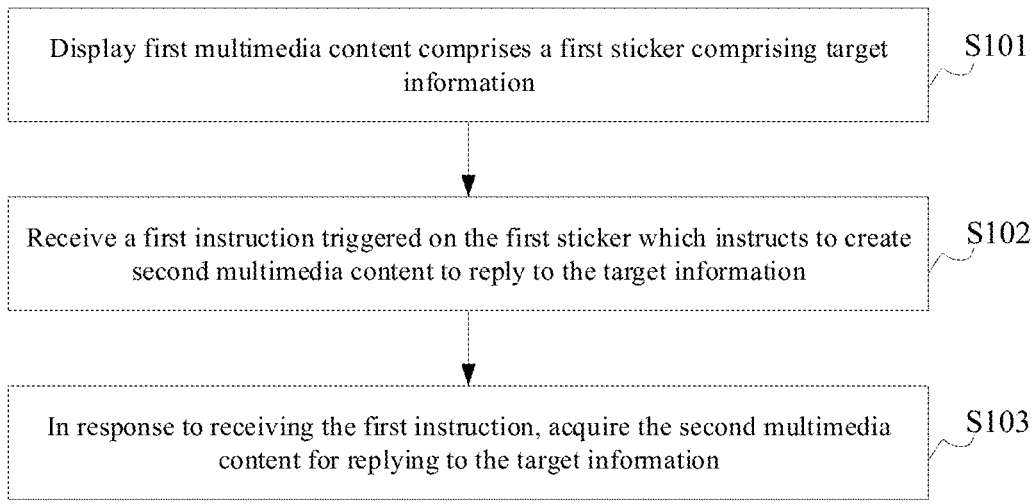
FIG. 2 is a flowchart of an information replying method provided by an embodiment of the present disclosure.

Referring to FIG. 2, FIG. 2 is a flowchart of an information replying method provided by some embodiments of the present disclosure. As shown in FIG. 2, the information replying method provided by the present disclosure may include the following steps.

S101: displaying first multimedia content comprises a first sticker comprising target information.

In some embodiments, a first multimedia content is played and a first sticker including target information is displayed in a playing interface of the first multimedia content, wherein the target information is associated with target multimedia content, i.e., original multimedia content.

The client can play the first multimedia content on the screen of the electronic device, and display the first sticker including the target information in the playing interface of the first multimedia content. In some embodiments, the implementation of the target information of the first multimedia content, the playing interface of the first multimedia content, the first sticker and the target multimedia content are not specifically limited in the present disclosure.

In some embodiments, the first multimedia content is multimedia content that replies to the target information in multimedia form. In some embodiments, the first multimedia content may be obtained through real-time acquisition, acquisition from the client, and acquisition from a storage module other than the client.

In some embodiments, the first sticker serves as an entry to reply to the target information in multimedia form. In some embodiments, the way of displaying the first sticker such as its shape, color and dynamic effect, and its display parameters such as its display position and display duration are not specifically limited in the present disclosure.

In addition, the first sticker can be displayed floating on the playing interface of the first multimedia content. Moreover, the first sticker is displayed at a position such that it does not block the playing picture of the first multimedia content completely or as much as possible. Thus, the smooth playback of the first multimedia content is guaranteed.

In some embodiments, the target information is information on comments/replies/questions about the target multimedia content, such as at least one of comment information or question information about the target multimedia content. In some embodiments, the specific content of the target information can be displayed as text or a picture in full or in an abbreviated manner.

For example, taking a case where the electronic device is a mobile phone, and the client is application 1 installed on the mobile phone as an example, for the specific implementation of the first multimedia content, reference can be made to the description of video 1 in FIG. 1A; for the specific implementation of the playing interface of the first multimedia content, reference can be made to the description of user interface 11 in FIG. 1A; for the specific implementation of the target information, reference can be made to the description of comment information 1 in FIG. 1A; for the specific implementation of the target multimedia content, reference can be made to the description of video 0 in FIGS. 1I to 1J; and for the specific implementation of the first sticker, reference can be made to the description of sticker 1 in FIG. 1A, which will not be repeated herein.

S102: receiving a first instruction for the first sticker, that is, a first instruction triggered on the first sticker, which instructs to make a reply to the target information in multimedia form. The first sticker is used for instructing to create second multimedia content to reply to the target information.

The user can perform a first operation such as a click, a double click, a long press, or a slide on the first sticker on the screen of the electronic device. The electronic device may detect the first operation and may convert the first operation into a first instruction. Thus, the electronic device can send the first instruction to the client, so that the client can determine that the user replies to the target information in multimedia form by means of the first sticker.

The implementation of the first instruction is not specifically limited in the present disclosure. For example, for the specific implementation of the first instruction, reference can be made to the instruction generated by the operation performed by user 3 in user interface 11 shown in FIG. 1B, such as a click on option 1051.

S103: in response to the first instruction, that is, in response to receiving the first instruction, acquiring the second multimedia content for replying to the target information.

The client can obtain a second multimedia content after receiving the first instruction.

In some embodiments, the second multimedia content is multimedia content that replies to the target information in multimedia form. In some embodiments, the second multimedia content may be obtained through real-time acquisition, acquisition from the client, and acquisition from a storage module other than the client.

In addition, the second multimedia content and the first multimedia content may be the same or different. In general, the second multimedia content is different from the first multimedia content, which is conducive to comprehensively replying to the target information through different multimedia contents, so that users may have a more profound understanding of the target information.

For example, taking a case where the electronic device is a mobile phone, and the client is application 1 installed on the mobile phone as an example, for the specific implementation of the second multimedia content, reference can be made to the description of video 2 obtained in FIGS. 1C to 1E, which will not be repeated herein.

To sum up, the client can not only play multimedia content and display a sticker including the target information to reply to the target information in multimedia form, but also trigger a further reply to the target information in multimedia form through the sticker. Thus, the client can obtain another multimedia content. To sum up, by means of the sticker, the client provides an additional channel to reply to the target information in multimedia form, so that users can create more multimedia contents.

In some embodiments, for the specific implementation of steps S101 to S103, reference can be made to the description of the embodiments shown in FIGS. 1A to 1E, which will not be described herein.

In the information replying method provided by the present disclosure, after replying to the target information in multimedia form, the client displays a first sticker including the target information in the playing interface of the first multimedia content while playing the first multimedia content. The client can use the first sticker as an entry to make a further reply to the target information in multimedia form. The client can obtain second multimedia content after receiving the first instruction for the first sticker to reply to the target information in multimedia form. Thus, by means of the sticker, a further reply can be made to the target information in multimedia form, which is conducive to enriching the way of information replying, improving the interest of users in information replying, and increasing the chance of users creating and publishing multimedia contents.

Based on the description of the above embodiment, in addition to providing an entry to reply to the target information in multimedia form by means of the sticker, the client can also provide an entry to view at least one of the target information or the information associated with the target information with the help of the sticker.

In some embodiments, the information associated with the target information may include, but is not limited to: information on comments/replies/questions about the target information, original information associated with the target information, and information on comments/replies/questions about the original information associated with the target information.

Below, a specific implementation of the information replying method of the present disclosure will be described in detail in conjunction with FIG. 3.

Figure 3:
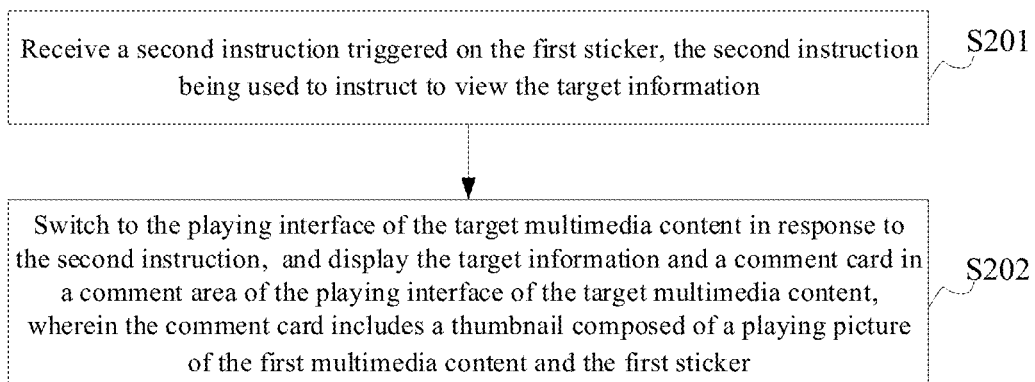
FIG. 3 is a flowchart of an information replying method provided by an embodiment of the present disclosure.

Referring to FIG. 3, FIG. 3 is a flowchart of an information replying method provided by some embodiments of the present disclosure. As shown in FIG. 3, the information replying method provided by the present disclosure may include the following steps.

S201: receiving a second instruction for the first sticker, that is, a second instruction triggered on the first sticker, the second instruction being used to instruct to view the target information.

The user can perform a second operation such as a click, a double click, a long press, or a slide on the first sticker on the screen of the electronic device. The electronic device may detect the second operation and may convert the second operation into a second instruction. Thus, the electronic device can send the second instruction to the client, so that the client can determine that the user views the target information and/or information associated with the target information by means of the first sticker.

The implementation of the second instruction is not specifically limited in the present disclosure. For example, for the specific implementation of the second instruction, reference can be made to the instruction generated by the operation performed by user 3 clicking on option 1052 in control 105 shown in FIG. 1B.

S202: switching to the playing interface of the target multimedia content in response to the second instruction, and displaying the target information and a comment card in a comment area of the playing interface of the target multimedia content, wherein the comment card includes a thumbnail composed of or including a playing picture of the first multimedia content and the first sticker.

After receiving the second instruction, the client can display the target information and the comment card, or the comment card in the comment area of the playing interface of the target multimedia content.

In some embodiments, the comment area of the playing interface of the target multimedia content is used to make comments on the target multimedia content or reply to the target multimedia content, and can take the form of text, symbols, pictures, moving pictures, multimedia and so on. That is, the comment area of the playing interface of the target multimedia content can carry all the information for making comments or replying to the playing interface of the target multimedia content.

The implementation of the playing interface of the target multimedia content, the comment area of the playing interface of the target multimedia content and the comment card is not specifically limited in the present disclosure.

In some embodiments, the first sticker in the comment card can be displayed floating on the playing interface of the first multimedia content, and the first sticker does not block the playback screen of the first multimedia content completely or as much as possible.

For example, taking a case where the electronic device is a mobile phone, and the client is application 1 installed on the mobile phone as an example, for the specific implementation of the playing interface of the target multimedia content, reference can be made to the description of user interface 30 shown in FIG. 1I; for the specific implementation of the comment area of the playing interface of the target multimedia content, reference can be made to the description of window 301 shown in FIG. 1I; and for the specific implementation of the comment card, reference can be made to the description of comment card 1 in area 302 shown in FIG. 1I, which will not be repeated herein.

Thus, in the comment area of the playing interface of the target multimedia content, the client can display information of a multimedia reply to the target information in a card, or the target information and information of a multimedia reply to the target information in a card, so as to ensure the complete display of all replied contents, and improve the readability of reply information.

In some embodiments, for the specific implementation of steps S201 to S202, reference can be made to the description of the embodiment shown in FIGS. 1B and 1I, which will not be described herein.

To sum up, by means of a sticker, the client can not only provide an entry to reply to the target information in multimedia form, but also provide an entry to view the target information and/or information associated with the target information, thereby improving the reusability of the sticker and enabling the user to operate conveniently.

Based on the description of the above embodiments, in step S101, in addition to the first multimedia content and the first sticker, in some embodiments, the client can display a link associated with the target information in the playing interface of the first multimedia content.

The link associated with the target information is used to trigger the display of the target information, for example, the display of the target information in the comment area of the playing interface of the target multimedia content.

For example, for the specific implementation of the link associated with the target information, reference can be made to the description of the link associated with comment information 1 in area 103 shown in FIG. 1A.

Thus, after receiving a trigger operation on the link, the client can switch to the playing interface of the target multimedia content, and display the target information and the comment card, or the comment card, in the comment area of the playing interface of the target multimedia content.

In some embodiments, the comment card may include a thumbnail composed of or including a playing picture of the first multimedia content and the first sticker. The implementation of the comment card is not specifically limited in the present disclosure.

For example, for the triggering operation of the link, reference can be made to the description of the click operation performed by the user in area 103 shown in FIG. 1A; for the playing interface of the target multimedia content, reference can be made to the description of user interface 30 shown in FIG. 1J; for the comment area of the playing interface of the target multimedia content, reference can be made to the description of window 301 shown in FIG. 1J; for the comment card, reference can be made to the description of comment card 2 in area 304 shown in FIG. 1J, which will not be repeated herein.

To sum up, the client can achieve a quick view of the target information and information associated with the target information through a view instruction for the sticker, which can improve the convenience of replying to the target information.

Based on the description of the above embodiments, in addition to acquiring a second multimedia content, in some embodiments, the client can add a link associated with the target information or a link associated with the target information and a text reply content to the second multimedia content, so as to obtain a second multimedia content added with the link.

In some embodiments, the link associated with the target information is used to trigger the display of the target information in the comment area of the playing interface of the target multimedia content.

For example, for the second multimedia content, reference can be made to the description of video 2 shown in FIG. 1F; for the link associated with the target information, reference can be made to the description of the link associated with comment information 1 in area 1071 shown in FIG. 1F; for the text reply content, reference can be made to the description of text reply content 2 in area 1071 shown in FIG. 1F; for the second multimedia content added with the link, reference can be made to the description of relevant information of video 2 shown in FIG. 1F, which will not be repeated herein.

Thus, the client can upload the second multimedia content with a link added to the server to publish the second multimedia content with a link added, so that the client can display the link or the link and the text reply content in the playing interface of the second multimedia content.

For example, for the specific implementation of the above steps, reference can be made to the description of FIGS. 1F to 1G, in which for uploading the second multimedia content with a link added, reference can be made to the description of transmitting relevant information of video 2 to the server after performing an operation such as a click on control 108 in user interface 15 shown in FIG. 1F; for displaying the link in the playing interface of the second multimedia content, reference can be made to the description of the link associated with comment information 1 in area 110 shown in FIG. 1G, and for displaying the text reply content in the playing interface of the second multimedia content, reference can be made to the description of text reply content 2 in area 110 shown in FIG. 1G, which will not be repeated herein.

To sum up, the client can add various types of elements to the multimedia content, which is conducive to enriching the playing interface of the multimedia content, and can improve the viewing performance and diversity of the reply to the target information.

Based on the description of the above embodiments, the client can upload relevant information of the second multimedia content to the server. Thus, the server can send a notification message to a client associated with the target information, so that the client associated with the target information can know in time that a user has replied to the target information in multimedia form, which is convenient for the user to view and reply again through the client associated with the target information.

For the specific implementation of the client associated with the target information, reference can be made to the description of the client associated with comment information 1, which will not be described herein.

In some embodiments, the notification message is used to notify a client associated with the target information that there is a multimedia reply to the target information. The implementation of the notification message is not specifically limited in the present disclosure.

Taking a second page (page 2) as an example, for the specific implementation of the notification message, reference can be made to the description of notification message 1 in user interface 20 shown in FIG. 1H, which will not be described herein.

Based on the description of the above embodiments, the client can also collectively display multimedia contents associated with the target information in an aggregation page, wherein, the implementation of the aggregation page and the display of multimedia contents in the aggregation page is not specifically limited in the present disclosure.

Thus, the client can display an aggregation page of at least one piece of multimedia content associated with the target information contained in the first sticker after receiving a third instruction for the first sticker.

The implementation of the third instruction is not specifically limited in the present disclosure. For example, for the specific implementation of the third instruction, reference can be made to the instruction generated by the operation such as a click on an area performed by the user in user interface 11 shown in FIG. 1A. This area is used for triggering the display of an aggregation page associated with comment information 1 in the application 1. The implementation of this area is not specifically limited in the present disclosure. In some embodiments, this area may be an area where control 1011 is located, or this area may be displayed floating on area 102 and represented by an identification, text, etc.

To sum up, through the aggregation page, the client can enable the user to comprehensively browse all multimedia contents associated with the target information, which is convenient for viewing and operating by the user.

Based on the description of the above embodiment, the client can also provide an entry for adding the target information into the Favorites by means of the sticker.

Thus, the client can add the target information to the Favorites after receiving an Add-to-Favorites instruction for the first sticker. The Add-to-Favorites instruction is used to instruct to add the target information to the Favorites.

The implementation of the Add-to-Favorites instruction is not specifically limited in the present disclosure. For example, for the specific implementation of the Add-to-Favorites instruction, reference can be made to the instruction generated by the operation such as a click on an area performed by the user in user interface 11 shown in FIG. 1A. This area is used to trigger the process of adding comment information 1 to the Favorites. The implementation of this area is not specifically limited in the present disclosure. In some embodiments, this area may be provided as an option which is similar to option 1051 or 1053 appeared by triggering control 1011, or is displayed floating on area 102 and represented by an identification, text, etc.

To sum up, by means of the sticker, the client can further provide an entry to add the target information in the Favorites, so that users can view the target information later.

Based on the description of the above embodiments, in step S101, since the target information is displayed in different positions of the client, for the implementation of the target information, reference can be made to the description of comment information 1. Therefore, the client can obtain the first multimedia content based on the target information displayed in different positions. For the implementation of the first multimedia content, reference can be made to the description of video 1.

Below, two feasible specific ways for the client to obtain the first multimedia content will be introduced in detail.

In some embodiments, the client can obtain the first multimedia content after receiving a fourth instruction indicating a multimedia reply to the target information displayed in the comment area of the playing interface of the target multimedia content.

The implementation of the fourth instruction is not specifically limited in the present disclosure. For example, for the specific implementation of the fourth instruction, reference can be made to the instruction generated by the operation such as a click on control 108 performed by the user in user interface 15 shown in FIGS. 1C to 1D for obtaining video 2.

In some embodiments, the target information can be obtained by replying to the target multimedia content in the form of text, symbols, pictures, moving pictures, etc., and is displayed in the comment area of the playing interface of the target multimedia content.

For example, for the comment area of the playing interface of the target multimedia content, reference can be made to the description of the comment area of the playing interface of video 0 in window 301 shown in FIG. 1K; for the target information, reference can be made to the description of comment information 1 in area 303 shown in FIG. 1K; and for the first multimedia content, reference can be made to the description of video 1 in user interface 11 shown in FIG. 1A, which will not be repeated herein. For the specific implementation of the above steps, reference can be made to the description of the embodiment shown in FIGS. 1K to 1M, which will not be described herein.

In other embodiments, the client can obtain the first multimedia content after receiving a fifth instruction indicating a multimedia reply to the target information displayed in a third sticker.

The implementation of the fifth instruction is not specifically limited in the present disclosure. For example, for the fifth instruction, reference can be made to the instruction generated by an operation such as a click on control 1014 performed by user 2 in user interface 17 shown in FIG. 1N.

For example, for the third sticker, reference can be made to the description of sticker 3 in control 1014 shown in FIG. 1N; for the target information, reference can be made to the description of comment information 1 in control 1014 shown in FIG. 1N; and for the first multimedia content, reference can be made to the description of video 1 in user interface 11 shown in FIG. 1A, which will not be repeated herein.

For the specific implementation of the above steps, reference can be made to the description of the embodiments shown in FIGS. 1K, 1N and 1A, which will not be described herein.

To sum up, the client can obtain the first multimedia content based on the target information displayed in different locations. Thus, the channels for creating multimedia content are enriched.

Based on the description of the above embodiments, in step S103, the client can switch to the acquisition interface of the second multimedia content after receiving the first instruction.

In some embodiments, the acquisition interface of the second multimedia content comprises a second sticker comprising the target information.

The implementation of the second multimedia content is not specifically limited in the present disclosure. For example, for the acquisition interface of the second multimedia content, reference can be made to the description of user interface 12 shown in FIG. 1C or user interface 13 shown in FIG. 1D, which will not be repeated herein. In some embodiments, the second sticker serves as an entry to reply to the target information in multimedia form, and the second sticker can be used to prompt the user to reply to the target information in multimedia form. The implementation of the second sticker is not specifically limited in the present disclosure. For example, for the second sticker, reference can be made to the description of control 1012 shown in FIG. 1C or 1D, which will not be repeated herein.

Thus, the client can acquire the second multimedia content after receiving an acquisition instruction for the second multimedia content in the acquisition interface of the second multimedia content.

The implementation of the acquisition instruction is not specifically limited in the present disclosure. For example, for the acquisition instruction, reference can be made to the description of the instruction generated for acquiring video 2 in FIG. 1C or 1D, and for the second multimedia content, reference can be made to the description of video 2 shown in FIG. 1C or 1D, which will not be repeated herein.

In addition, the client can also obtain parameters of the second sticker in order to enrich the display style of the sticker. The playing interface of the second multimedia content and the display parameters of the second sticker can be obtained in any order.

In some embodiments, the way of displaying the second sticker such as its shape, color and dynamic effect, and its display parameters such as its display position and display duration are not specifically limited in the present disclosure. In some embodiments, the display parameters of the second sticker may include at least one of a display mode, a display position, and a display duration. In addition, the second sticker may maintain the same or different display parameters as the first sticker. In addition, the client can play the second multimedia content and display the second sticker in the playing interface of the second multimedia content, wherein, the second sticker can be displayed floating on the playing interface of the second multimedia content. Moreover, the second sticker is displayed at a position such that it does not block the playback of the second multimedia content completely or as much as possible. Thus, the smooth playback of the second multimedia content is guaranteed.

For example, for the implementation of the above steps, reference can be made to the description of FIG. 1G; for the specific implementation of the target information, reference can be made to the description of comment information 1 in FIG. 1G; for the specific implementation of the second multimedia content, reference can be made to the description of video 2 in FIG. 1G; and for the specific implementation of the second sticker, reference can be made to the description of sticker 2 in FIG. 1G, which will not be repeated herein.

Illustratively, the present disclosure provides an information replying apparatus.

Figure 4:
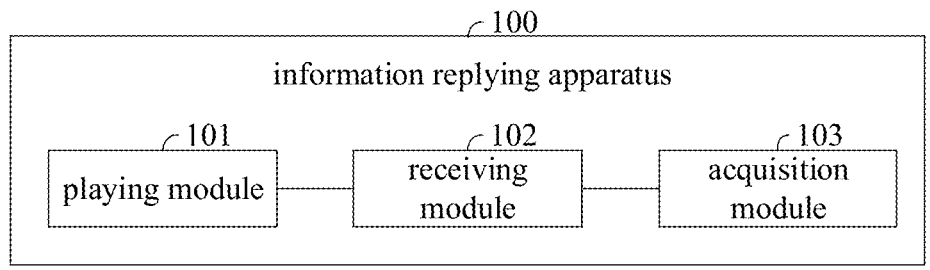
FIG. 4 is a flowchart of an information replying method provided by an embodiment of the present disclosure.

Referring to FIG. 4, FIG. 4 is a structural diagram of an information replying apparatus provided by some embodiments of the present disclosure. The information replying apparatus of the present disclosure can be provided in a client, and can realize the operations of the information replying method corresponding to the client in the above embodiments of FIGS. 1A-1N, 2 and 3.

As shown in FIG. 4, the information replying apparatus 100 provided by the present disclosure may include a playing module 101, a receiving module 102 and an acquisition module 103.

The playing module 101 is used for playing first multimedia content and displaying a first sticker including target information in a playing interface of the first multimedia content, wherein the target information is associated with target multimedia content.

The receiving module 102 is used for receiving a first instruction for the first sticker which instructs to make a reply to the target information in multimedia form.

The acquisition module 103 is used for, in response to the first instruction, acquiring second multimedia content for replying to the target information. In some embodiments, the first multimedia content includes multimedia content that replies to the target information in multimedia form, and the target information is at least one of comment information or question information for the target multimedia content.

In some embodiments, the receiving module 102 is further used for receiving a second instruction for the first sticker, wherein the second instruction is used to instruct to view the target information;
the playing module 101 is further used for switching to the playing interface of the target multimedia content in response to the second instruction, and displaying the target information and a comment card in a comment area of the playing interface of the target multimedia content, wherein the comment card includes a thumbnail composed of or including a playing picture of the first multimedia content and the first sticker.

In some embodiments, the playing module 101 is further used for displaying a link associated with the target information in the playing interface of the first multimedia content, wherein the link is used to trigger the display of the target information; receiving a trigger operation on the link, switching to the playing interface of the target multimedia content, and displaying the target information and a comment card in the comment area of the playing interface of the target multimedia content, wherein the comment card includes a thumbnail composed of or including a playing picture of the first multimedia content and the first sticker.

Figure 5:
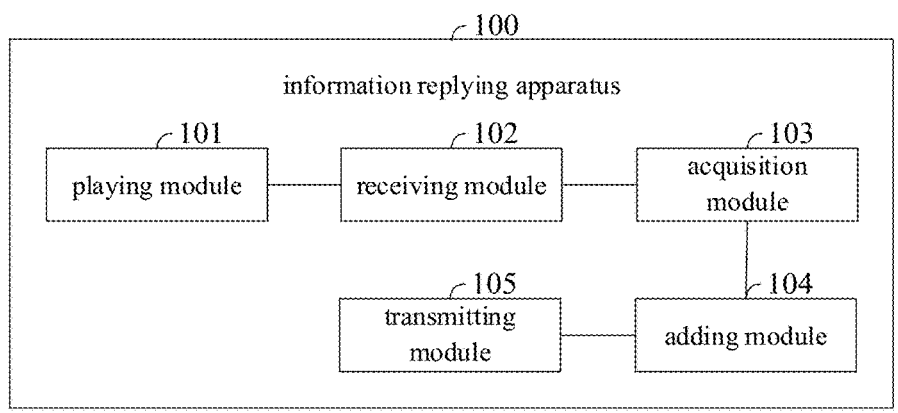
FIG. 5 is a structural diagram of an information replying apparatus provided by an embodiment of the present disclosure.

Referring to FIG. 5, FIG. 5 is a structural diagram of an information replying apparatus provided by some embodiments of the present disclosure. As shown in FIG. 5, on the basis of the apparatus shown in FIG. 4, the information replying apparatus 100 provided by the present disclosure may further include an adding module 104 and a transmitting module 105.

The adding module 104 is used for adding a link associated with the target information to the second multimedia content to obtain a second multimedia content with a link added, wherein the link is used to trigger the display of the target information;
the transmitting module 105 is used for uploading the second multimedia content with a link added to a server to enable the display of the link in the playing interface of the second multimedia content.

In some embodiments, the transmitting module 105 is further used for uploading the second multimedia content to the server so that the server can send a notification message to at least one client associated with the target information, wherein the notification message is used to notify at least one client that the target information has been replied in multimedia form.

In some embodiments, the playing module 101 is further used for displaying an aggregation page of at least one multimedia content associated with the target information included in the first sticker after receiving a third instruction for the first sticker.

In some embodiments, the first multimedia content is acquired after receiving a fourth instruction indicating a multimedia reply to the target information displayed in the comment area of the playing interface of the target multimedia content;

or the first multimedia content is acquired after receiving a fifth instruction indicating a multimedia reply to the target information displayed in a third sticker.

In some embodiments, the playing module 101 is further used for switching to an acquisition interface of the second multimedia content in response to the first instruction.

The acquisition module 103 is specifically used for acquiring the second multimedia content after receiving an acquisition instruction for the second multimedia content in the acquisition interface of the second multimedia content.

In some embodiments, the acquisition interface of the second multimedia content comprises a second sticker comprising the target information.

In some embodiments, display parameters of the second sticker include at least one of a display mode, a display position, or a display duration of the second sticker.

In some embodiments, the playing module 101 is further used for playing the second multimedia content and displaying a second sticker in the playing interface of the second multimedia content.

Figure 6:
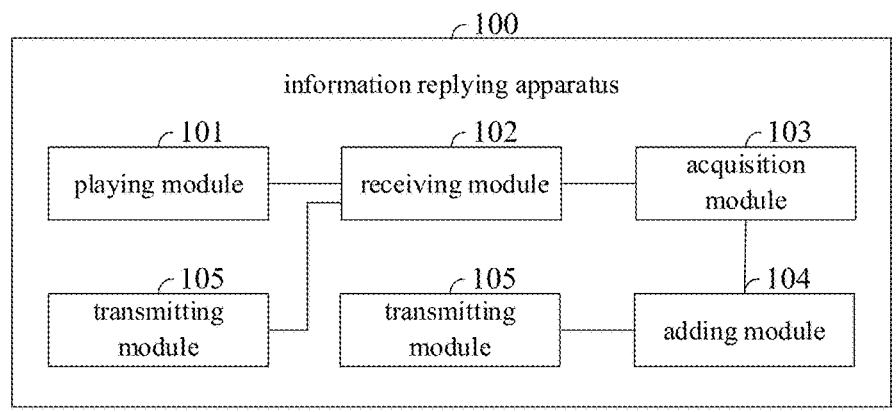
FIG. 6 is a structural diagram of an information replying apparatus provided by an embodiment of the present disclosure.

Referring to FIG. 6, FIG. 6 is a structural diagram of an information replying apparatus provided by an embodiment of the present disclosure. As shown in FIG. 6, on the basis of the apparatus shown in FIG. 4 or 5, the information replying apparatus 100 provided by the present disclosure may further include an add-to-favorites module 106.

The receiving module 102 is further used for receiving an add-to-favorites instruction for the first sticker, wherein the add-to-favorites instruction is used to add the target information in the Favorites.

The add-to-favorites module 106 is used for adding the target information to the Favorites in response to the add-to-favorites instruction.

The information replying apparatus provided by the present disclosure can implement the above method embodiments. For its specific implementation principles and technical effect, reference can be made to the above method embodiment, which will not be repeated herein.

Illustratively, the present disclosure provides a client, including one or more processors; a memory; and one or more computer programs; wherein the one or more computer programs are stored in the memory; wherein the one or more processors, when executing the one or more computer programs, enable the client to implement the information replying method of forgoing embodiments.

Illustratively, the present disclosure discloses a chip system applied to an electronic device including a display, a memory and a sensor, the chip system including: a processor; wherein the processor, when executing computer instructions stored in the memory, enable the electronic device to implement the information replying method of forgoing embodiments.

Illustratively, the present disclosure provides a non-transitory computer-readable storage medium having stored thereon a computer program that, when executed by a processor, causes an electronic device to implement the information replying method of forgoing embodiments.

Illustratively, the present disclosure provides a non-transitory computer program product that, when running on a computer, causes the computer to execute the information replying method of forgoing embodiments.

Illustratively, the present disclosure provides an electronic device, including one or more processors; a memory; and one or more computer programs; wherein the one or more computer programs are stored in the memory; wherein the one or more processors, when executing the one or more computer programs, cause the electronic device to implement the information replying method of forgoing embodiments.

In the above embodiments, all or part of the functions can be realized by software, hardware, or a combination thereof. When implemented in software, it can be implemented in whole or in part in the form of a computer program product. The computer program product includes one or more computer instructions. The computer program instructions, when loaded and executed on a computer, can generate in whole or in part the processes or functions according to embodiments of the present disclosure. The computer may be a general purpose computer, a special purpose computer, a computer network, or other programmable device. The computer instructions may be stored in a computer-readable storage medium. The computer-readable storage medium can be any available medium that can be accessed by a computer or a data storage device such as a server, data center, or the like that contains one or more of the available media integrated therein. The available media may be magnetic media (e.g., floppy disks, hard disks, magnetic tapes), optical media (e.g., DVDs), or semiconductor media (e.g., solid state disks (SSDs)), and the like.

Note that, in this description, the use of relational terms, if any, such as "first" and "second" and the like are used solely to distinguish one from another entity or action without necessarily requiring or implying any actual such relationship or order between such entities or actions. Further, terms "include", "comprise" or their any other variations are intended to encompass non-exclusive composition, so that a process, method, product or device comprising a series of factors may comprise not only these factors, but also other factors that are not listed explicitly, or factors intrinsic to this process, method, product or device. Without limitation, a factor defined by wording "comprise one . . . " does not exclude the existence of other same factors in a process, method, product or device comprising such factor.

The above descriptions are only specific embodiments of the present disclosure, so that those skilled in the art can understand or implement the present disclosure. Various modifications to these embodiments will be apparent to those skilled in the art, and the generic principles defined herein may be implemented in other embodiments without departing from the spirit or scope of the present disclosure. Accordingly, the present disclosure should not be limited to the specific embodiments described herein, but should be accorded the broadest scope consistent with the principles and novel features disclosed herein.

What is claimed is:

1. An information replying method, comprising:
    displaying first multimedia content which comprises a first sticker comprising target information, wherein the target information is at least one of comment information or topic information associated with original multimedia content, and the first multimedia content comprises multimedia content that associated with the target information;
    receiving a first instruction triggered on the first sticker, which instructs to create second multimedia content associated with the target information;

in response to receiving the first instruction, acquiring the second multimedia content;
adding a representation of a link associated with the target information to the second multimedia content, wherein the link is for directing to a displaying interface of the target information; and
uploading the second multimedia content to a server, wherein the representation of the link is displayed with the second multimedia content in a video playing interface.

2. The method according to claim 1, further comprising:
receiving a second instruction triggered on the first sticker, wherein the second instruction is used to instruct to view the target information; and
switching to a playing interface of the target multimedia content in response to the second instruction, and displaying the target information and a comment card in a comment area of the playing interface of the target multimedia content, wherein the comment card comprises a thumbnail comprising a playing picture of the first multimedia content and the first sticker.

3. The method according to claim 1, further comprising:
displaying a link associated with the target information in a playing interface of the first multimedia content, wherein the link is used to trigger a display of the target information; and
receiving a trigger operation on the link, switching to the playing interface of the target multimedia content, and displaying the target information and a comment card in the comment area of the playing interface of the target multimedia content, wherein the comment card comprises a thumbnail comprising a playing picture of the first multimedia content and the first sticker.

4. The method according to claim 1, further comprising:
uploading the second multimedia content to a server so that the server sends a notification message to at least one client associated with the target information, wherein the notification message is used to notify the at least one client that the target information has been replied in multimedia form.

5. The method according to claim 1, further comprising:
displaying an aggregation page of at least one multimedia content associated with the target information in the first sticker after receiving a third instruction for the first sticker.

6. The method according to claim 1, wherein
the first multimedia content is acquired after receiving a fourth instruction indicating a multimedia reply to the target information displayed in the comment area of the playing interface of the target multimedia content; or
the first multimedia content is acquired after receiving a fifth instruction indicating a multimedia reply to the target information displayed in a third sticker.

7. The method according to claim 1, wherein the acquiring second multimedia content for replying to the target information in response to the first instruction comprises:
switching to an acquisition interface of the second multimedia content in response to the first instruction; and
acquiring the second multimedia content after receiving an acquisition instruction for the second multimedia content in the acquisition interface of the second multimedia content.

8. The method according to claim 7, wherein the acquisition interface of the second multimedia content comprises a second sticker comprising the target information, and display parameter(s) of the second sticker comprise at least one of a display mode, a display position, or a display duration of the second sticker.

9. The method according to claim 8, further comprising:
playing the second multimedia content and displaying the second sticker in a playing interface of the second multimedia content.

10. The method according to claim 1, further comprising:
receiving an add-to-favorites instruction triggered on the first sticker, wherein the add-to-favorites instruction is used to add the target information in Favorites; and
adding the target information to the Favorites in response to the add-to-favorites instruction.

11. An electronic device, comprising:
one or more processors;
a memory; and
one or more computer programs; wherein the one or more computer programs are stored in the memory;
the one or more processors, when executing the one or more computer programs, enable the electronic device to implement an information replying method comprising:
displaying first multimedia content which comprises a first sticker comprising target information, wherein the target information is at least one of comment information or topic information associated with original multimedia content, and the first multimedia content comprises multimedia content that associated with the target information;
receiving a first instruction triggered on the first sticker, which instructs to create second multimedia content associated with the target information;
in response to receiving the first instruction, acquiring the second multimedia content;
adding a representation of a link associated with the target information to the second multimedia content, wherein the link is for directing to a displaying interface of the target information; and
uploading the second multimedia content to a server, wherein the representation of the link is displayed with the second multimedia content in a video playing interface.

12. The electronic device according to claim 11, wherein the first multimedia content comprises multimedia content that replies to the target information in multimedia form, and the target information is at least one of comment information or topic information for the target multimedia content.

13. The electronic device according to claim 11, wherein the one or more processors are configured to:
receive a second instruction for the first sticker, wherein the second instruction is used to instruct to view the target information; and
switch to a playing interface of the target multimedia content in response to the second instruction, and display the target information and a comment card in a comment area of the playing interface of the target multimedia content, wherein the comment card comprises a thumbnail comprising a playing picture of the first multimedia content and the first sticker.

14. The electronic device according to claim 11, wherein the one or more processors are configured to:
display a link associated with the target information in the playing interface of the first multimedia content, wherein the link is used to trigger a display of the target information; and
receive a trigger operation on the link, switching to the playing interface of the target multimedia content, and display the target information and a comment card in the comment area of the playing interface of the target multimedia content, wherein the comment card comprises a thumbnail comprising a playing picture of the first multimedia content and the first sticker.

15. The electronic device according to claim 11, wherein the one or more processors are configured to:
    upload the second multimedia content to a server so that the server sends a notification message to at least one client associated with the target information, wherein the notification message is used to notify the at least one client that the target information has been replied in multimedia form.

16. The electronic device according to claim 11, wherein the one or more processors are configured to:
    display an aggregation page of at least one multimedia content associated with the target information in the first sticker after receiving a third instruction for the first sticker.

17. A non-transitory computer storage medium, characterized in comprising computer instructions that, when running on an electronic device, cause the electronic device to implement an information replying method comprising:
    displaying first multimedia content which comprises a first sticker comprising target information, wherein the target information is at least one of comment information or topic information associated with original multimedia content, and the first multimedia content comprises multimedia content that associated with the target information;
    receiving a first instruction triggered on the first sticker, which instructs to create second multimedia content associated with the target information;
    in response to receiving the first instruction, acquiring the second multimedia content;
    adding a representation of a link associated with the target information to the second multimedia content, wherein the link is for directing to a displaying interface of the target information; and
    uploading the second multimedia content to a server, wherein the representation of the link is displayed with the second multimedia content in a video playing interface.

* * * * *